United States Patent [19]

Seraji

[11] Patent Number: 4,999,553
[45] Date of Patent: Mar. 12, 1991

[54] METHOD AND APPARATUS FOR CONFIGURATION CONTROL OF REDUNDANT ROBOTS

[75] Inventor: Homayoun Seraji, La Crescenta, Calif.

[73] Assignee: The United States of America as represented by the Administrator of the National Aeronautics and Space Administration, Washington, D.C.

[21] Appl. No.: 459,029

[22] Filed: Dec. 28, 1989

[51] Int. Cl.$^5$ .............................................. G05B 19/42
[52] U.S. Cl. .................................. 318/561; 318/646; 318/648; 318/628; 364/478; 364/513; 901/9; 901/14
[58] Field of Search ............................... 318/560–640; 364/513, 474.31, 474.30; 901/3, 9, 12, 13, 14, 15, 16, 17, 18, 19, 20–24

[56] References Cited

U.S. PATENT DOCUMENTS

| | | | |
|---|---|---|---|
| 4,156,835 | 5/1979 | Whitney et al. | 318/561 |
| 4,243,923 | 1/1981 | Whitney et al. | 318/561 |
| 4,621,332 | 11/1986 | Sugimoto et al. | |
| 4,639,652 | 1/1987 | Takahashi et al. | 318/568.1 |
| 4,641,251 | 2/1987 | Inoue | |
| 4,685,054 | 8/1987 | Manninen et al. | |
| 4,725,942 | 2/1988 | Osuka | |
| 4,727,303 | 2/1988 | Morse et al. | 318/616 |
| 4,763,276 | 8/1988 | Perreirra et al. | 364/513 |
| 4,794,547 | 12/1988 | Nishida | |
| 4,808,063 | 2/1989 | Haley | 901/9 X |
| 4,835,450 | 5/1989 | Suzuki | 901/14 X |
| 4,860,215 | 8/1989 | Seraji | |
| 4,887,222 | 12/1989 | Miyake et al. | 901/15 X |

Primary Examiner—William M. Shoop, Jr.
Assistant Examiner—Paul Ip
Attorney, Agent, or Firm—Thomas H. Jones; John R. Manning

[57] ABSTRACT

A method and apparatus to control a robot or manipulator configuration over the entire motion based on augmentation of the manipulator forward kinematics. A set of kinematic functions is defined in Cartesian or joint space to reflect the desirable configuration that will be achieved in addition to the specified end-effector motion. The user-defined kinematic functions and the end-effector Cartesian coordinates are combined to form a set of task-related configuration variables as generalized coordinates for the manipulator. A task-based adaptive scheme is then utilized to directly control the configuration variables so as to achieve tracking of some desired reference trajectories throughout the robot motion. This accomplishes the basic task of desired end-effector motion, while utilizing the redundancy to achieve any additional task through the desired time variation of the kinematic functions. The present invention can also be used for optimization of any kinematic objective function, or for satisfaction of a set of kinematic inequality constraints, as in an obstacle avoidance problem. In contrast to pseudoinverse-based methods, the configuration control scheme ensures cyclic motion of the manipulator, which is an essential requirement for repetitive operations. The control law is simple and computationally very fast, and does not require either the complex manipulator dynamic model or the complicated inverse kinematic transformation. The configuration control scheme can alternatively be implemented in joint space.

20 Claims, 8 Drawing Sheets

METHOD AND APPARATUS FOR CONFIGURATION CONTROL OF REDUNDANT ROBOTS

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates generally to robotics and more specifically to a method and apparatus for configuration control of robots having redundant joints by defining task-related kinematic functions and combining them with end-effector coordinates to form a set of configuration variables which reflects one or more additional tasks that will be performed due to the redundancy.

BACKGROUND ART

The remarkable dexterity and versatility that the human arm exhibits in performing various tasks can be attributed largely to the kinematic redundancy of the arm, which provides the capability of reconfiguring the arm without affecting the hand position. A robotic manipulator is called (kinematically) "redundant" if it possesses more degrees of freedom (DOF) than is necessary for performing a specified task. Redundancy of a robotic manipulator is therefore determined relative to the particular task to be performed. For example, in the two-dimensional space, a planar robot with three joints is redundant for achieving any end-effector position; whereas the robot is non-redundant for tasks involving both position and orientation of the end-effector. In the three-dimensional space, a manipulator with seven or more joints is redundant because six degrees of freedom are sufficient to position and orient the end-effector in any desired configuration. In a non-redundant manipulator, a given position and orientation of the end-effector corresponds to a limited set of joint angles and associated robot configurations with distinct poses (such as elbow up or down). Therefore, for a prescribed end-effector trajectory and a given pose, the motion of the robot is uniquely determined. When this motion is undesirable due to collision with obstacles, approaching kinematic singularities, or reaching joint limits, there is no freedom to reconfigure the robot so as to reach around the obstacles, or avoid the singularities and joint limits.

Redundancy in the manipulator structure yields increased dexterity and versatility for performing a task due to the infinite number of joint motions which result in the same end-effector trajectory. However, this richness in choice of joint motions complicates the manipulator control problem considerably. In order to take full advantage of the capabilities of redundant manipulators, effective control schemes should be developed to utilize the redundancy in some useful manner. During recent years, redundant manipulators have been the subject of considerable research, and in the following references several methods have been suggested to resolve the redundancy:

1. D. E. Whitney, "Resolved motion rate control of manipulators and human prostheses," IEEE Trans. Man-Machine Syst., vol. MMS-10, no. 2, pp. 47–53, 1969.
2. A. Liegeois, "Automatic supervisory control of the configuration and behavior of multibody mechanisms," IEEE Trans. System, Man Cybern., vol. SMC-7, no. 12, pp. 868–871, 1977.
3. H. Hanafusa, T. Yoshikawa, and Y. Nakamura, "Analysis and control of articulated robot arms with redundancy," in Proc. 8th IFAC Triennial World Congress (Kyoto, Japan, 1981) pp. 1927–1932.
4. T. Yoshikawa, "Analysis and control of robot manipulator with redundancy," in Proc. 1st Int. Symp. on Robotics Research (Bretton Woods, NH, 1983), pp. 735–747.
5. Y. Nakamura and H. Hanafusa, "Task priority based redundancy control of robot manipulators," in Proc. 2nd Int. Symp. on Robotics Research (Kyoto, Japan, August 1984).
6. T. Yoshikawa, "Manipulability and redundancy control of robotic mechanisms," in Proc. IEEE Int. Conf. on Robotics and Automation (St. Louis, Mo., March 1985), pp. 1004–1009.
7. J. Baillieul, J. Hollerbach, and R. Brockett, "Programming and control of kinematically redundant manipulators," in Proc. 23rd IEEE Conf. on Decision and Control, pp. 768–774, December 1984.
8. J. Baillieul, "Kinematic programming alternatives for redundant manipulators," in Proc. IEEE Int. Conf. on Robotics and Automation (St. Louis, Mo., March 1985), pp. 772–728.
9. ———, "Avoiding obstacles and resolving kinematic redundancy," in Proc. IEEE Int. Conf. on Robotics and Automation (San Francisco, Calif., April 1986), pp. 1698–1704.
10. J. Baillieul, R. Brockett, J. Hollerbach, D. Martin, R. Percy, and R. Thomas, "Kinematically redundant robot manipulators," in Proc. NASA Workshop on Space Telerobotics (Pasadena, Calif.,), vol. 2, pp. 245–255, January 1987.
11. J. Baillieul, "Design of kinematically redundant mechanisms," in Proc. 24th IEEE Conf. on Decision and Control (Ft. Lauderdale, Fla., December 1985), pp. 18–21.
12. I. D. Walker and S. I. Marcus, "An approach to the control of kinematically redundant robot manipulators," in Proc. American Control Conf. (Seattle, Wash., June 1986), pp. 1907–1912.
13. C. A. Klein and C. H. Huang, "Review of pseudoinverse control for use with kinematically redundant manipulators," IEEE Trans. System, Man Cybern., vol. SMC-13, no. 3, pp. 245–250, 1983.
14. S. Y. Oh, D. Orin, and M. Bach, "An inverse kinematic solution for kinematically redundant robot manipulators," J. Robotic Syst., vol. 1, no. 3, pp. 235–249, 1984.
15. S. Y. Oh, "Inverse kinematic control for redundant manipulators," in Proc. IEEE Workshop on Intelligent Control (Troy, N.Y., 1985), pp. 53–57.
16. O. Khatib, "A unified approach for motion and force control of robot manipulators: The operational space formulation," IEEE J. Robotics Automat., vol. RA-3, no. 1, pp. 43–53, 1987.
17. C. A. Klein, "Use of redundancy in the design of robotic systems," in Proc. 2nd Int. Symp. on Robotics Research (Kyoto, Japan, August 1984).
18. A. A. Maciejewski and C. A. Klein, "Obstacle avoidance for kinematically redundant manipulators in dynamically varying environments," Int. J. Robotics Res., vol. 4, no. 3, pp. 109-117. 1985.
19. C. A Klein and A. I. Chirco, "Dynamic simulation of a kinematically redundant manipulator system," J. Robotic Syst., vol. 4, no. 1, pp. 5-23, 1987.
20. D. R. Baker and C. W. Wampler, "Some facts concerning the inverse kinematics of redundant manipulators," in Proc. IEEE Int. Conf. on Robotics and Automation (Raleigh, N.C., March 1987). pp. 604-609.
21. J. M. Hollerbach, "Optimum kinematic design for a seven degree of freedom manipulator," in Proc. 2nd Int. Symp. on Robotics Research (Kyoto, Japan, August 1984).
22. J. M. Hollerbach and K. C. Suh, "Redundancy resolution of manipulators through torque optimization," in Proc. IEEE Int. Conf. on Robotics and Automation (St. Louis, Mo., March 1985), pp. 1016-1021.
23. O. Egeland, "Cartesian control of a hydraulic redundant manipulator," in Proc. IEEE Int. Conf. on Robotics and Automation (Raleigh, N.C., April 1987), pp. 2081-2086.
24. L. Sciavicco and B. Siciliano, "A dynamic solution to the inverse kinematic problem for redundant manipulators," in Proc. IEEE Int. Conf. on Robotics and Automation (Raleigh, N.C., April 1987), pp. 1081-1087.
25. P. Hsu, J. hauser, and S. Sastry, "Dynamic control of redundant manipulators," in Proc. IEEE Int. Conf. on Robotics and Automation (Philadelphia, Pa., April 1988), pp. 183-187.
26. R. V. Dubey, J. A. Euler, and S. M. Babcock, "An efficient gradient projection optimization scheme for a 7 dof redundant robot with spherical wrist," in Proc. IEEE Int. Conf. on Robotics and Automation (Philadelphia, Pa., April 1988), pp. 28-36.

Whitney [1] suggests the use of Jacobian pseudoinverse for the control of redundant manipulators. Liegeois [2] proposes a modification to the pseudoinverse approach to resolve manipulator redundancy. Nakamura and Yoshikawa [3]-[6] develop a scheme based on task priority using pseudoinverses. Baillieul [7]-[11] proposes the extended Jacobian method to minimize or maximize an objective function. Walker and Marcus [12] suggest a method based on the pseudoinverse approach to impose a constraint relationship on the manipulator. A comprehensive review of the pseudoinverse approach to redundant manipulators is given by Klein and Huang [13]. Oh, Orin, and Bach [14], [15] describe a numerical procedure for solving the inverse kinematic problem which uses constraints on the manipulator. Khatib [16] gives a method for the resolution of redundancy using the robot dynamics in the operational space. Klein [17]-[19] addresses obstacle avoidance and dynamic simulation of redundant robots. Baker and Wampler [20] study the kinematic properties of redundant manipulators. The problems of robot design and torque optimization are addressed by Hollerbach [21], [22]. Egeland [23] describes a method for Cartesian control of a hydraulic redundant manipulator. Sciavicco and Siciliano [24] give dynamic solution to the inverse kinematic problem for redundant robots. Hsu, Hauser, and Sastry [25] discuss the resolution of redundancy using the manipulator dynamics. Dubey, Euler, and Babcock [26] describe a gradient projection optimization scheme for 7-DOF robots.

Over the past two decades, investigations of redundant manipulators have often been explicitly or implicitly based on the Jacobian pseudoinverse approach for the utilization of redundancy through local optimization of some objective function. Furthermore, most proposed methods resolve the redundancy in joint space and are concerned solely with solving the inverse kinematic problem for redundant manipulators.

U.S. Pat. No. 4,860,215 issued Aug. 22, 1988 to the inventor herein, discloses related subject matter and background prior art. U.S. Pat. Nos. 4,685,054; 4,621,332; 4,794,547; and 4,641,251 also disclose relevant, but distinguishable subject matter.

SUMMARY OF THE INVENTION

In the present invention, a new and conceptually simple approach to configuration control of redundant manipulators constitutes a complete departure from the conventional pseudoinverse methods. In this approach, the redundancy is utilized for control of the manipulator configuration directly in task space, where the task is performed; thus avoiding the complicated inverse kinematic transformation. A set of kinematic functions in Cartesian or joint space is chosen to reflect the desired additional task that will be performed due to the redundancy. The kinematic functions can be viewed as parameterization of the manipulator "self-motion," in which the internal movement of the links does not move the end-effector. In other words, given the end-effector position and orientation, the kinematic functions are used to "shape" the manipulator configuration. The end-effector Cartesian coordinates and the kinematic functions are combined to form a set of "configuration variables" which describe the physical configuration of the entire manipulator in the task space. The control scheme then ensures that the configuration variables track some desired trajectories as closely as possible, so that the manipulator motion meets the task requirements. The control law is adaptive and does not require knowledge of the complex dynamic model or parameter values of the manipulator or payload. The scheme can be implemented in either a centralized or a decentralized control structure, and is computationally very fast, making it specially suitable for real-time control of redundant manipulators.

OBJECTS OF THE INVENTION

It is therefore a principal object of the present invention to provide an apparatus and method for configuration control of redundant robots or manipulators.

It is an additional object of the present invention to provide an apparatus and method for achieving trajectory tracking for the end-effector of a redundant robot or a manipulator directly in the Cartesian space to perform a desired task while simultaneously imposing a set of kinematic constraints to accomplish an appropriate additional task.

It is still an additional object of the present invention to provide an apparatus and method implemented with a redundant robot real-time control scheme which resolves the redundancy at the task level to provide direct control over the entire motion and which produces a cyclical end configuration.

BRIEF DESCRIPTION OF THE DRAWINGS

The aforementioned objects and advantages of the present, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

I. The Robot

The mechanical manipulator under consideration consists of a linkage of rigid bodies with n revolute or prismatic joints. Let T be the n×1 vector of torques or forces applied at the joints and $\theta$ be the n×1 vector of the resulting relative joint rotations or translations. The dynamic equation of motion of the manipulator which relates T to $\theta$ can be represented in the general form $$M(\theta)\ddot{\theta} + N(\theta,\dot{\theta}) = T \quad (1)$$

where the matrices M and N are highly complex non-linear functions of and the payload. Let the m×1 vector Y (with m<n) represent the position and orientation of the end-effector (last link) with respect to a fixed Cartesian coordinate system in the m-dimensional task space where the task is to be performed. The m×1 end-effector coordinate vector Y is related to the n×1 joint angle vector $\theta$ by the forward kinematic model $$Y = Y(\theta) \quad (2)$$

where $Y(\theta)$ is an m×1 vector whose elements are non-linear functions of the joint angles and link parameters, and which embodies the geometry of the manipulator. For a redundant manipulator, a Cartesian coordinate vector (such as Y) that specifies the end-effector position and orientation does not constitute a set of generalized coordinates to completely describe the manipulator dynamics. Nonetheless, equations (1) and (2) form a valid dynamic model that describes the end-effector motion itself in the task space. The desired motion of the end-effector is represented by the reference position and orientation trajectories denoted by the m×1 vector $Y_d(t)$, where the elements of $Y_d(t)$ are continuous twice-differential functions of time. The vector $Y_d(t)$ embodies the information on the "basic task" to be accomplished by the end-effector in the task space.

We now discuss the definition of configuration variables and the task-based control of redundant manipulators.

II. Definition of Configuration Variables

Let $r = n - m$ be the "degree-of-redundancy" of the manipulator, i.e., the number of "extra" joints. Let us define a set of r kinematic functions $\{\phi_1(\theta), \phi_2(\theta), \ldots, \phi_r(\theta)\}$ in Cartesian or joint space to reflect the "additional task" that will be performed due to the manipulator redundancy. Each $\phi_i$ can be a function of the joint angles $\{\theta_1, \ldots, \theta_n\}$ and the link geometric parameters. The choice of kinematic functions can be made in several ways to represent, for instance, the Cartesian coordinates of any point on the manipulator, or any combination of the joint angles. The kinematic functions parameterize the "self-motion" of the manipulator, in which the internal movement of the links does not move the end-effector.

Figure 1:
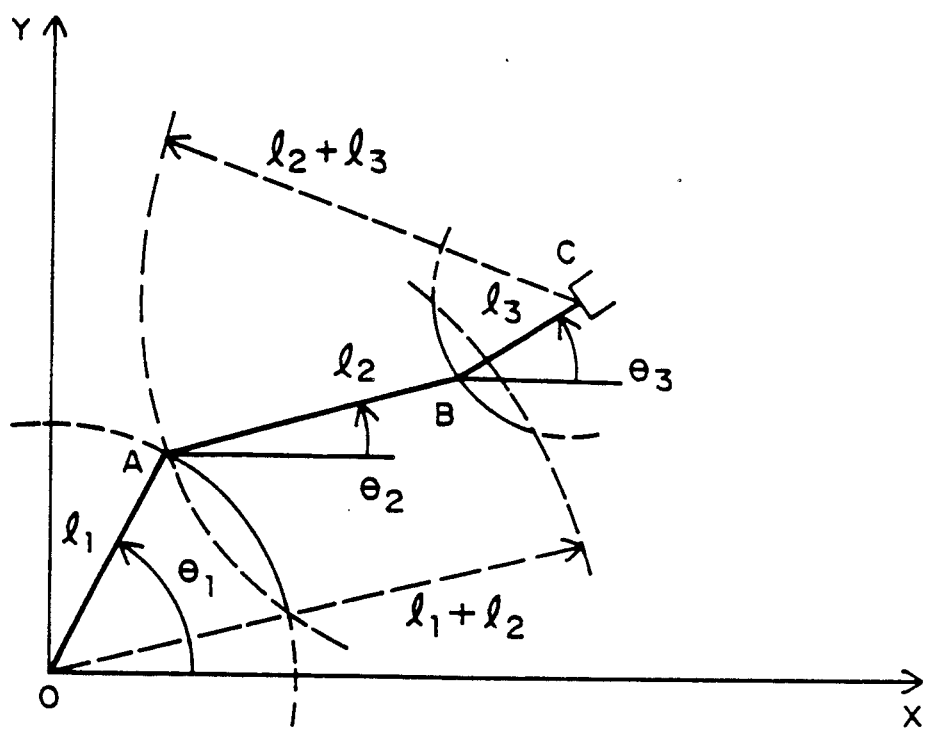
FIG. 1 is a graphical illustration of a planar three-link arm.
Figure 2:
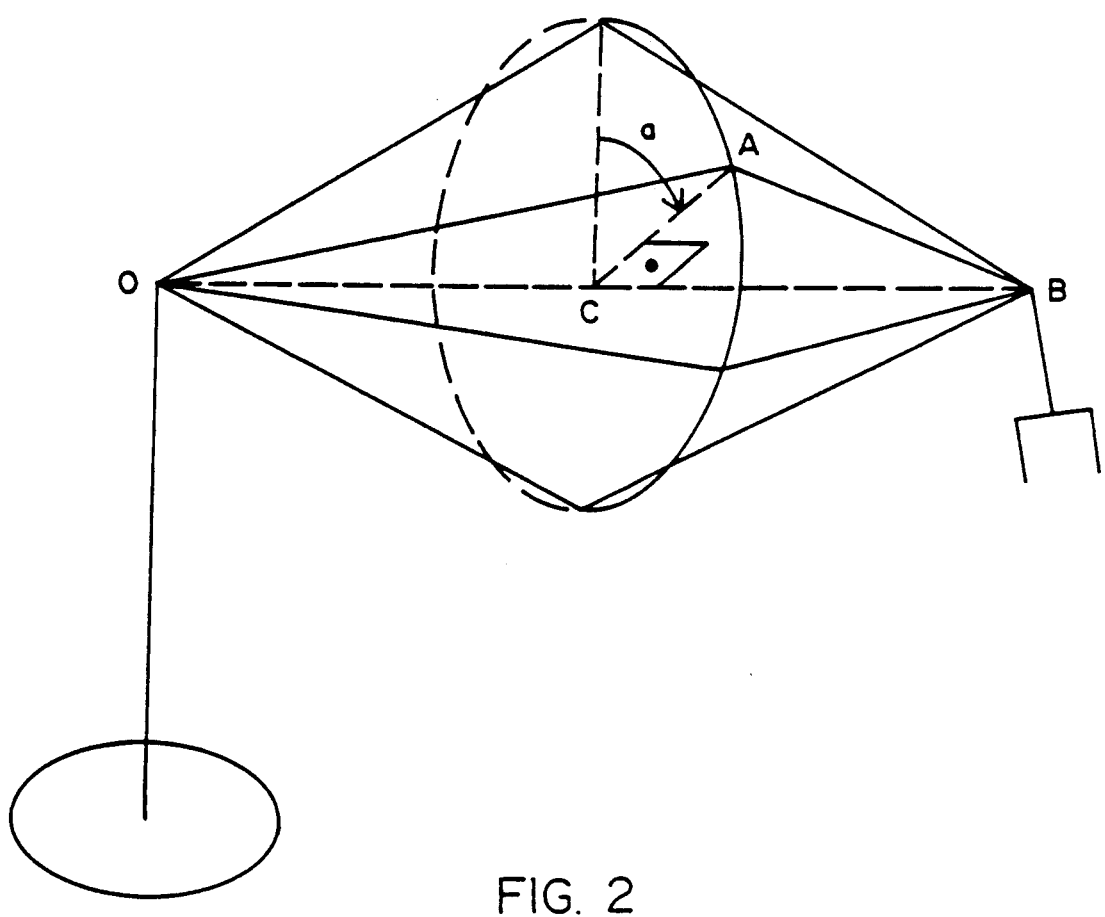
FIG. 2 is a schematic illustration of a seven degree of freedom arm.

For illustration, consider the planar three-link arm shown in FIG. 1. The basic task is to control the end-effector position coordinates [x, y] in the base frame. Suppose that we fix the end-effector position and allow internal motion of the links so that the arm takes all possible configurations. It is found that the locus of point A is an arc of a circle with center O and radius $l_1$ which satisfies the distance constraint $AC \leq (l_2 + l_3)$. Likewise, the locus of point B is an arc of a circle with center C and radius $l_3$ which satisfies $OB \leq (l_1 + l_2)$. The loci of A and B are shown by solid arcs in FIG. 1(a), and represent the self-motion of the arm. Now in order to characterize the self-motion, we can select a kinematic function $\phi(\theta)$ to represent, for instance, the terminal angle $\phi = \theta_3$ in joint space, or alternatively we can designate the wrist height $y_B$ as the kinematic function $\phi = l_1 \sin \theta_1 + l_2 \sin \theta_2$ in Cartesian space. The choice of $\theta$ clearly depends on the particular task that we wish to perform by the utilization of redundancy, in addition to the end-effector motion. Let us now consider the spacial 7-DOF arm [21] shown in FIG. 2, in which the end-effector position and orientation are of concern. With the end-effector frame fixed in space, the self-motion of the arm consists of the elbow transcribing a circle with center C and radius CA, as shown in FIG. 2. This circle is the intersection of a sphere with center O and radius OA, and another sphere with center B and radius BA. In order to parameterize the self-motion, we can now define the kinematic function $\phi(\theta) = a$, where a is the angle between the plane OAB and the vertical plane passing through OB, as shown in FIG. 2. The kinematic function $\phi$ then succinctly describes the redundancy and gives a simple characterization of the self-motion.

Once a set or r task-related kinematic functions $\Phi = \{\phi_1, \phi_2, \ldots, \phi_r\}$ is defined, we have a partial information on the manipulator configuration. The set of m end-effector position and orientation coordinates $Y = \{y_1, y_2, \ldots, y_m\}$ provides the remaining information on the configuration. Let us now combine the two sets $\Phi$ and Y to obtain a complete set of n configuration variables as $$X = \{Y, \Phi\} = \left\{ y_1, y_2, \ldots, y_m, \phi_1, \phi_2, \ldots, \phi_r \right\} \quad (3)$$

$$= \{x_1, x_2, \ldots, x_n\}.$$

The $n \times 1$ vector X is referred to as the "configuration vector" of the redundant manipulator and the elements of X, namely $\{x_1, \ldots, x_n\}$, are called the "configuration variables." The configuration variables define an n-dimensional "task space" whose coordinate axes are $\{x_1, x_2, \ldots, x_n\}$. The task space is composed of two subspaces; namely, the m-dimensional end-effector subspace with axes $\{x_1, \ldots, x_m\}$ and the r-dimensional subspace due to kinematic functions with axes $\{x_{m+1}, \ldots, x_n\}$. The configuration variables $\{x_1, \ldots, x_n\}$ constitute a set of generalized coordinates for the redundant manipulator in a given region of the workspace. Using the configuration vector X, the manipulator is fully specified kinematically and is no longer redundant in this representation. It is noted that in some applications, certain end-effector coordinates are not relevant to the task, for instance, in a spot welding task the orientation of the end-effector is not important. In such cases, the present approach allows the designer to replace the insignificant end-effector coordinates with additional kinematic functions which are more relevant to the particular application. In fact, if m' ($<$m) end-effector coordinates are specified, then $n - m' = r'(>r)$ kinematic functions can be defined.

The augmented forward kinematic model which relates the configuration vector X to the joint angle vector $\theta$ is now given by $$X = \begin{pmatrix} Y(\theta) \\ \cdots \\ \Phi(\theta) \end{pmatrix} = X(\theta). \quad (4)$$

From (4), the differential kinematic model which relates the rates of change of X and $\theta$ is obtained as $$\dot{X}(t) = J(\theta)\dot{\theta}(t) \quad (5)$$

where $$J(\theta) = \begin{pmatrix} J_e(\theta) \\ \cdots \\ J_c(\theta) \end{pmatrix} = \begin{pmatrix} \frac{\partial Y}{\partial \theta} \\ \cdots \\ \frac{\partial \Phi}{\partial \theta} \end{pmatrix} \quad (6)$$

is the $n \times n$ augmented Jacobian matrix. The $m \times n$ submatrix $J_e(\theta) = \partial Y/\partial \theta$ is associated with the end-effector, while the $r \times n$ submatrix $J_c(\theta) = \partial \Phi/\partial \theta$ is related to the kinematic functions. The combination of the two non-square submatrices $J_e$ and $J_c$ forms the square Jacobian matrix J.

The augmented Jacobian matrix J can be used to test the functional independence of the kinematic functions $\{\phi_1, \ldots, \phi_r\}$ and the end-effector coordinates $\{y_1, \ldots, y_m\}$. For the set of configuration variables $X_1 = \{x, \ldots, x_n\}$ to be functionally independent through out the workspace, if suffices to check that det $[J(\theta)]$ is not identically zero for all $\theta$. In other words, when the augmented Jacobian matrix J is rank-deficient for all values of $\theta$, the kinematic functions chosen are functionally dependent on the end-effector coordinates and a different choice of $\Phi$ is necessary. For example, consider the three-link planar arm in FIG. 1 with the end-effector coordinates [x, y] and suppose that we define the end-effector distance from the origin, i.e., OC, as the kinematic function $\Phi(\theta)$, that is, $$\phi(\theta) = (OC)^2 = x^2 + y^2.$$

The third row of the resulting Jacobian matrix is $$J_c = \begin{bmatrix} \frac{\partial \phi}{\partial \theta_1} & \frac{\partial \phi}{\partial \theta_2} & \frac{\partial \phi}{\partial \theta_3} \end{bmatrix}$$

$$= \begin{bmatrix} 2x\frac{\partial x}{\partial \theta_1} + 2y\frac{\partial y}{\partial \theta_1}, & 2x\frac{\partial x}{\partial \theta_2} + 2y\frac{\partial y}{\partial \theta_2}, & 2x\frac{\partial x}{\partial \theta_3} + 2y\frac{\partial y}{\partial \theta_3} \end{bmatrix}$$

$$= [2x, 2y] \begin{bmatrix} \frac{\partial x}{\partial \theta_1} & \frac{\partial x}{\partial \theta_2} & \frac{\partial x}{\partial \theta_3} \\ \frac{\partial y}{\partial \theta_1} & \frac{\partial y}{\partial \theta_2} & \frac{\partial y}{\partial \theta_3} \end{bmatrix} = [2x, 2y]J_e.$$

It is seen that the third row is a linear combination of the first and second rows, and hence $$det[J] = det\begin{pmatrix} J_e \\ J_c \end{pmatrix} = 0$$

for all $\theta$. This implies that the particular choice of $\Phi(\theta)$ is not independent of the end-effector coordinates, as expected, and is therefore unacceptable.

When det $[J(\theta)]$ is not identically zero, the configuration variables $\{x_1, \ldots, x_n\}$ are not functionally dependent for all $\theta$. Nonetheless, there can be certain joint configurations $\theta = \theta_0$ at which det $[J(\theta_0)] = 0$, i.e., the augmented Jacobian matrix J is rank-deficient. This implies that the rows $J^i$ of J satisfy the linear relationship $$\sum_{i=1}^{n} c_i J^i = 0$$

where $c^i$ are some constants which are not all zero. Since the changes of the configuration variables and joint angles are related by $\Delta x = J(\theta)\Delta \theta$, we conclude that at $\theta = \theta_0$ $$\sum_{i=1}^{n} c_i \Delta x_i = 0.$$

Therefore, at a Jacobian singularity, the changes in the configuration variables $\{\Delta x_1, \ldots, \Delta x_n\}$ must satisfy the constraint relationship $$\sum_{i=1}^{n} c_i \Delta x_i = 0$$

and hence the configuration vector X cannot be changed arbitrarily. This also implies that $$\sum_{i=1}^{n} c_i \dot{x}_i = 0$$

i.e., no combination of joint velocities will produce motion along certain directions in the task space. From equation (6), it is clear that the Jacobian matrix J will be singular at any joint configuration for which the submatrix $J_e$ is rank-deficient; i.e., at any end-effector singular configuration. These are referred to as kinematic singularities of the manipulator. Due to the additional task requirements, algorithmic singularities may further be introduced into the Jacobian matrix J due to the submatrix $J_c$. These singularities occur when either $J_c$ is rank-deficient or some rows of $J_c$ and $J_e$ are linearly dependent. However, by a judicious choice of the kinematic functions, some algorithmic singularities may be avoided. Further discussion of the augmented Jacobian singularities can be found in J. Burdick and H. Seraji, "Characterization and control of self-motions in redundant manipulators," in Proc. NASA Conf. on Space Telerobotics (Pasadena, Calif., 1989).

For the sake of illustration, let us reconsider the planar three-link arm shown in FIG. 1. Let x and y represent the Cartesian coordinates of the hand (C) position to be controlled, and suppose that the hand orientation is not of concern so that the arm is redundant with the degree of redundancy equal to one. Suppose that we wish to utilize the redundancy in order to control the elbows (A) position or equivalently the shoulder shoulder angle $\theta_1$, in addition to the hand position. For this purpose, the kinematic function can be defined in a number of ways such as

| | |
|---|---|
| $\Phi = l_1 \sin \theta_1$ | elbow vertical position |
| $\Phi = l_1 \cos \theta_1$ | elbow horizontal position |
| $\Phi = \theta_1$ | shoulder angle. |

The above choices of $\phi$ will serve the same purpose. Nonetheless, each choice of $\phi$ will yield a different augmented Jacobian matrix J and hence different singular configurations. Let us take the last choice of $\phi$ and, from FIG. 1, obtain the configuration variables for the arm as $$x = l_1 \cos\theta_1 + l_2 \cos\theta_2 + l_3 \cos\theta_3$$

$$y = l_1 \sin\theta_1 + l_2 \sin\theta_2 + l_3 \sin\theta_3$$

$$\phi = \theta_1.$$

From these equations, the augmented Jacobian matrix is found to be $$J = \begin{pmatrix} J_e \\ \cdots \\ J_c \end{pmatrix} = \begin{bmatrix} -l_1\sin\theta_1 & -l_2\sin\theta_2 & -l_3\sin\theta_3 \\ l_1\cos\theta_1 & l_2\cos\theta_2 & l_3\cos\theta_3 \\ 1 & 0 & 0 \end{bmatrix}$$

and hence $$\det J = l_2 l_3 \sin(\theta_3 - \theta_2).$$

The singular configurations are obtained from det J=0 as $\theta_3 = \theta_2$ and $\theta_3 = \theta_2 + 180°$. It is seen that for our particular choice of $\phi$, the arm "appears" to be a two-link arm ($l_2$, $l_3$) with a moveable base (A). As for any two-link arm, the two singular configurations are when the arm is either fully extended ($\theta_3 = \theta_2$) or fully folded ($\theta_3 = \theta_2 + 180°$). It is noted that if, instead, the elbow vertical or horizontal position is selected as the kinematic function $\phi$, additional algorithmic singularities will be introduced at $\theta_1 = \pm 90°$ or $\theta_1 = 0°, 180°$, respectively. Therefore, the choice of the kinematic function $\phi$ is a critical factor in determining the algorithmic singularities of the arm. From this example, we see that it is preferable to choose a combination of joint angles as a kinematic function, if feasible, since the resulting Jacobian matrix $J_c$ will then consist of a constant row which does not depend on the robot configuration. Otherwise additional algorithmic singularities may be introduced due to $J_c$.

An alternative way to utilize the redundancy is to ensure avoidance of certain kinematic singularities, in addition to desired end-effector motion. For the three-link arm, the square of "manipulability measure" [6] associated with the end-effector can be defined as the kinematic function $\phi$, namely $$\begin{aligned}\theta(\phi) &= det[J_e(\theta) J_e'(\theta)] \\ &= l_1^2 l_2^2 \sin^2(\theta_2 - \theta_1) + l_1^2 l_3^2 \sin^2(\theta_3 - \theta_1) + \\ & \quad l_2^2 l_3^2 \sin^2(\theta_3 - \theta_2)\end{aligned}$$

where $J_e(\theta)$ is the end-effector Jacobian matrix, and the prime denotes transposition. The function $\phi(\theta)$ will be zero at the kinematic singularities related to the end-effector. In order to avoid these singularities, the redundancy is used to ensure that the manipulability measure $\phi(\theta)$ is a non-zero constant or tracks some desired positive time function $\phi_d(t)$.

III. Task-Based Configuration Control

Suppose that a user-defined "additional task" can be expressed by the following kinematic equality constraint relationships:

$$\begin{aligned}\phi_1(\theta) &= \phi_{d1}(t) \\ \phi_2(\theta) &= \phi_{d2}(t) \\ &\vdots \\ \phi_r(\theta) &= \phi_{dr}(t)\end{aligned} \quad (7)$$

where $\phi_{di}(t)$ denotes the desired time variation of the kinematic function $\phi_i$ and is a user-specified continuous twice-differentiable function of time so that $\dot{\phi}_{di}(t)$ and $\ddot{\phi}_{di}(t)$ are defined. The above kinematic relationships can be represented collectively in the vector form $$\Phi(\theta) = \Phi_d(t) \quad (8)$$

where $\Phi$ and $\Phi_d$ are $r \times 1$ vectors. Equation (8) represents a set of "kinematic constraints" on the manipulator and defines the task that will be performed in addition to the basic task of desired end-effector motion. The kinematic equality constraints (8) are chosen to have physical interpretations and are used to formulate the desireable characteristics of the manipulator configuration in terms of motion of other members of the manipulator. The utilization of redundancy to provide direct control over the entire robot configuration enables the user to specify the evolution of the robot configuration while the end-effector is traveling a prescribed path. This control strategy is particularly useful for maneuvering the robot in a constricted workspace or a cluttered environment. Since the robot "shape" is controlled directly, it can be configured to fit within a restricted space or keep clear of workspace objects. For instance in the 7-DOF arm of FIG. 2, the user can ensure that the arm assumes a desired angle relative to the vertical, when the hand reaches the goal location. Alternatively, by controlling the elbow height as well as the hand coordinates, we can ensure that the elbow reaches over vertical obstacles (such as walls) in the workspace while the hand tracks the desired trajectory. The proposed formulation appears to be a highly promising approach to the additional task performance in comparison with the previous approaches which attempt to minimize or maximize objective functions, since we are now able to make a more specific statement about the evolution of the manipulator configuration. The present approach also covers the intuitive solution to redundant arm control in which certain joint angles are held constant for a portion of the task in order to resolve the redundancy. The functional forms of the kinematic functions $\phi_i$ and their desired behavior $\phi_{di}$ may vary widely for different additional tasks, making the approach unrestricted to any particular type of application.

Figure 3:
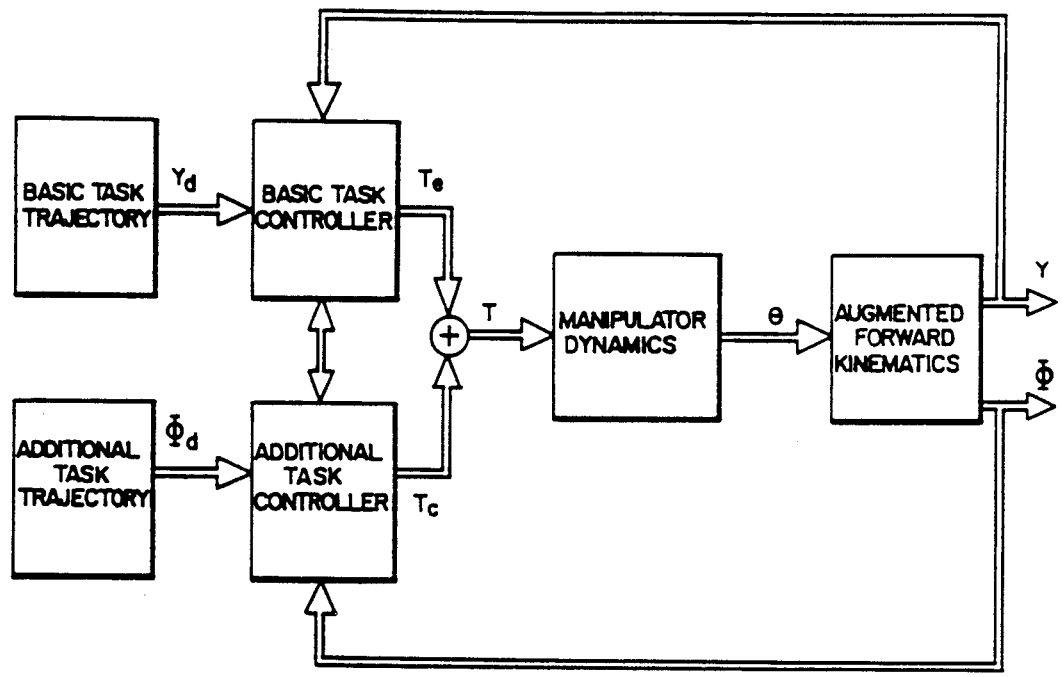
FIG. 3 is a block diagram representation of the architecture of the configuration control scheme of the present invention.

Based on the foregoing formulation, we can now consider the manipulator with the $n \times 1$ configuration vector $$X = \begin{pmatrix} Y \\ \Phi \end{pmatrix}$$

and the augmented forward kinematic model $X = X(\theta)$. Once the desired motion of the end-effector $Y_d(t)$ is specified for the particular basic task and the required evolution of the kinematic functions $\phi_d(t)$ is specified to meet the desired additional task, the $n \times 1$ desired configuration vector $$X_d(t) = \begin{pmatrix} Y_d(t) \\ \Phi_d(t) \end{pmatrix}$$

is fully determined. The configuration control problem for the redundant manipulator is to devise a dynamic control scheme as shown in FIG. 3 which ensures that the manipulator configuration vector $X(t)$ tracks the desired trajectory vector $X_d(t)$ as closely as possible. In the control system shown in FIG. 3, the actual end-effector position $Y(t)$ and the current value of the kinematic functions $\Phi(t)$ are first computed based on the joint positions $\theta(t)$ using the augmented forward kinematic model (4). This information is then fed back to the controller which also receives the commanded end-effector motion $Y_d(t)$ and the desired time variation $\Phi_d(t)$ to compute the driving torques $T(t)$. These torques are applied at the manipulator joints so as to meet the basic and additional task requirements simultaneously.

Once the forward kinematic model of the manipulator is augmented to include the kinematic functions, different control strategies can be improvised to meet the above tracking requirement, taking into account the dynamics of the manipulator given by (1). There are two major techniques for the design of tracking controllers in task space; namely, model-based control and adaptive control. For the model-based control [16], the manipulator dynamics is first expressed in task space as $$M_x(\theta)\ddot{X} + N_x(\theta, \dot{\theta}) = F \tag{9}$$

where F is the $n \times 1$ "virtual" control force vector in the task space, and $M_x$ and $N_x$ are obtained from equations (1)-(6). The centralized control law which achieves tracking through global linearization and decoupling is given by $$F = M_x(\theta)[\ddot{X}_d(t) + K_v(\dot{X}_d)t) - \dot{X}(t)) + K_p(X_d(t) - X(t))] + N_x(\theta, \dot{\theta}) \tag{10}$$

where $K_p$ and $K_v$ are constant position and velocity feedback gain matrices. This control formulation requires a precise knowledge of the full dynamic model and parameter values of the manipulator and the payload. Furthermore, since $M_x$ and $N_x$ depend on the definition of the kinematic functions $\phi$, any change in the additional task specifications requires reevaluation of the robot dynamic model (9). The alternative approach is the adaptive control technique in which the on-line adaptation of the controller gains eliminates the need for the complex manipulator dynamic model. In this section, we adopt an adaptive control scheme which has been validated experimentally on a PUMA industrial robot. The adaptive controller produces the control signal base on the observed performance of the manipulator and has therefore the capability to operate with minimal information on the manipulator/payload and to cope with unpredictable gross variations in the payload.

Figure 4:
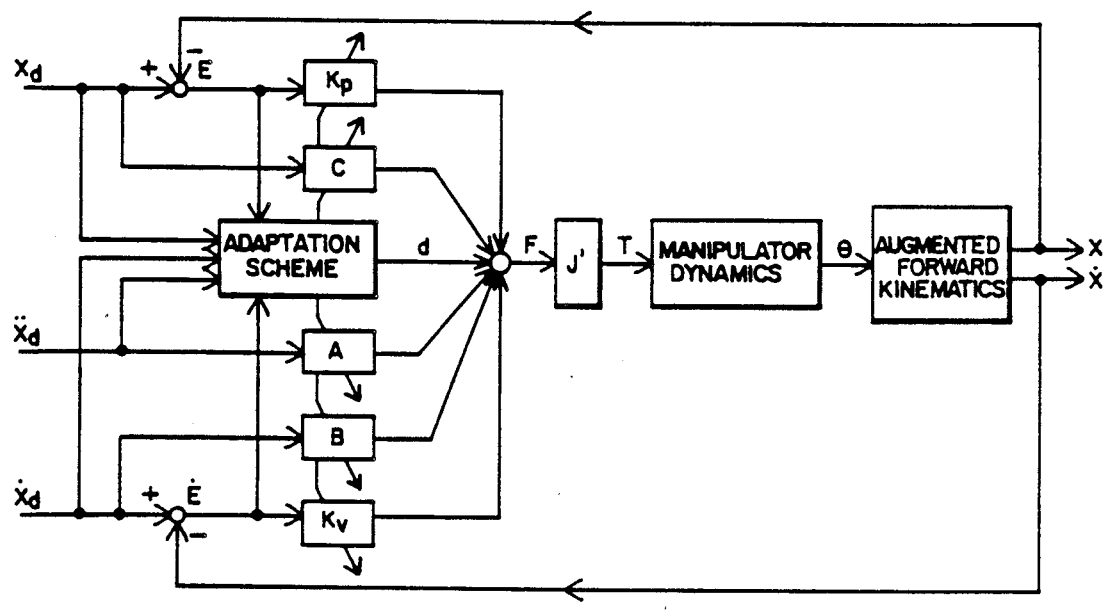
FIG. 4 is a block diagram representation of the centralized adaptive control law in the task space as used in the invention.

The proposed adaptive control scheme is developed within the framework of Model Reference Adaptive Control (MRAC) theory, and the centralized adaptive tracking control law in the task space is $$F(t) = d(t) + [K_p(t)E(t) + K_v(t)\dot{E}(t)] + [C(t)X_d(t) + B(t)\dot{X}_d(t) + A(t)\ddot{X}_d(t)] \tag{11}$$

as shown in FIG. 4. This control force is composed of three components, namely:

(i) The auxiliary signal d(t) is synthesized by the adaptation scheme and improves transient performance while resulting in better tracking and providing more flexibility in the design.

(ii) The term $(K_p(t)E(t) + K_v(t)\dot{E}(t))$ is due to the PD feedback controller acting on the position tracking error $E(t) = X_d(t) - X(t)$ and the velocity tracking error $\dot{E}(t) = \dot{X}_d(t) - \dot{X}(t)$.

(iii) The term $(C(t)X_d(t) + B(t)\dot{X}_d(t) + A(t)\ddot{X}_d(t))$ is the contribution of the PD$^2$ feedforward controller operating on the desired position $X_d(t)$, the desired velocity $\dot{X}_d(t)$, and the desired acceleration $\ddot{X}_d(t)$.

The required auxiliary signal and feedback/feedforward controller gains are updated based on the $n \times 1$ "weighted" error vector q(t) by the following simple adaptation laws:

$$q(t) = W_p E(t) + W_v \dot{E}(t) \tag{12}$$

$$d(t) = d(0) + \delta_1 \int_0^t q(t)dt + \delta_2 q(t) \tag{13}$$

$$K_p(t) = K_p(0) + \alpha_1 \int_0^t q(t)E(t)dt + \alpha_2 q(t)E(t) \tag{14}$$

$$K_v(t) = K_v(0) + \beta_1 \int_0^t q(t)\dot{E}(t)dt + \beta_2 q(t)\dot{E}(t) \tag{15}$$

$$C(t) = C(0) + \nu_1 \int_0^t q(t)X_d(t)dt + \nu_2 q(t)X_d(t) \tag{16}$$

$$B(t) = B(0) + \gamma_1 \int_0^t q(t)\dot{X}_d(t)dt + \gamma_2 q(t)\dot{X}_d(t) \tag{17}$$

$$A(t) = A(0) + \lambda_1 \int_0^t q(t)\ddot{X}_d(t)dt + \lambda_2 q(t)\ddot{X}_d(t). \tag{18}$$

In (13)–(18), $\{\delta_1, \alpha_1, \beta_1, \nu_1, \gamma_1, \lambda_1\}$, are any positive scalar integral adaptation gains, and $\{\delta_2, \alpha_2, \beta_2, \nu_2, \gamma_2\}$ are zero or any positive scalar proportional adaptation gains. In (12), $W_p = \text{diag}_i\{w_{Pi}\}$ and $W_v = \text{diag}_i\{w_{vi}\}$ are $n \times n$ weighting matrices chosen by the designer to reflect the relative significance of the position and velocity errors $E$ and $\dot{E}$ in forming the vector $q$. The values of the adaptation gains and weighting matrices determine the rate at which the tracking errors converge to zero.

Since the control actuation is at the manipulator joints, the control force $F$ is implemented as the joint torque $T$ where $$T(t) = J'(\theta)F(t). \tag{19}$$

The augmented Jacobian matrix $J(\theta)$ is used in (19) to map the task-space forces $F(t)$ to the joint-space torques $T(t)$. Equation (19) represents the fundamental relationship between the task and joint spaces and is the basis for implementation of any task-based control scheme. Equation (19) can be rewritten as $$T(t) = [J_e'(\theta) \vdots J_c'(\theta)] \begin{bmatrix} F_e(t) \\ \cdots \\ F_c(t) \end{bmatrix} = J_e'(\theta)F_e(t) + J_c'(\theta)F_c(t) \tag{20}$$

where $F_e$ and $F_c$ are the $m \times 1$ and $r \times 1$ control force vectors corresponding to the basic task and the additional task, respectively. It is seen that the total control torque is the sum of two components: $T_e = J_e' F_e$ due to the end-effector motion (basic task) and $T_c = J_c' F_c$ due to the kinematic constraints (additional task). Equation (20) shows distinctly the contributions of the basic and the additional tasks to the overall control torque. Under the joint control law (20), the desired end-effector trajectory $Y_d(t)$ is tracked, and the "extra" degrees of freedom are appropriately used to control the evolution of the manipulator configuration through tracking of the desired functions $\phi_d(t)$. In other words, the self-motion of the manipulator is controlled by first characterizing this motion in terms of user-defined kinematic functions and then controlling these functions through trajectory tracking.

In the foregoing centralized adaptive controller (11), each task-space control force $F_i$ is generated on the basis of all configuration variables $\{x_1, \ldots, x_n\}$. The controller complexity and computations can be reduced significantly if the adaptive control scheme is implemented in a decentralized control structure. In this case, each task-space control force $F_i$ is responsible only for the corresponding configuration variable $x_i$, and each $x_i$ is controlled independently of the others by a local adaptive controller. The couplings between the configuration variables then appear as "disturbances" and the adaptation laws are modified slightly to compensate for the unmodeled disturbances. The local control scheme for the configuration variable $x_i$ is $$F_i(t) + K_{pi}(t)e_i(t) + K_{vi}(t)\dot{e}_i(t) + c_i(t)X_{di}(t) + b_i(t)\dot{X}_{di}(t) + a_i(t)\ddot{X}_{di}(t) \tag{21}$$

where $e_i = x_{di} - x_i$ is the tracking error of the ith configuration variable, and the modified adaptation laws are $$q_i(t) = w_{pi}e_i(t) + w_{vi}\dot{e}_i(t) \tag{22}$$

$$d_i(t) = d_i(0) - \sigma_i \int_0^t d_i(t)dt + \delta_{1i} \int_0^t q_i(t)dt + \delta_{2i}q_i(t) \tag{23}$$

$$k_{pi}(t) = k_{pi}(0) - \sigma_i \int_0^t k_{pi}(t)dt + \tag{24}$$

$$\alpha_{1i} \int_0^t q_i(t)e_i(t)dt + \alpha_{2i}q_i(t)e_i(t)$$

$$k_{vi}(t) = k_{vi}(0) - \sigma_i \int_0^t k_{vi}(t)dt + \tag{25}$$

$$\beta_{1i} \int_0^t q_i(t)\dot{e}_i(t)dt + \beta_{2i}q_i(t)\dot{e}_i(t)$$

$$c_i(t) = c_i(0) - \sigma_i \int_0^t c_i(t)dt + \tag{26}$$

$$\nu_{1i} \int_0^t q_i(t)x_{di}(t)dt + \nu_{2i}q_i(t)x_{di}(t)$$

$$b_i(t) = b_i(0) - \sigma_i \int_0^t b_i(t)dt + \tag{27}$$

$$\gamma_{1i} \int_0^t q_i(t)\dot{x}_{di}(t)dt + \gamma_{2i}q_i(t)\dot{x}_{di}(t)$$

$$a_i(t) = a_i(0) - \sigma_i \int_0^t a_i(t)dt + \tag{28}$$

$$\lambda_{1i} \int_0^t q_i(t)\ddot{x}_{di}(t)dt + \lambda_{2i}q_i(t)\ddot{x}_{di}(t)$$

where $\sigma_i$ is a positive scalar design parameter. Using the local control law (21), each end-effector, coordinate $y_i$ and each kinematic function $\phi_i$ are controlled independently of the remaining configuration variables. The decentralized adaptive control scheme (21)–(28) can be computed much faster than the centralized control law (11)–(18), since the number of mathematical operations is reduced considerably due to decentralization. Note that although the task-space control law (21) is decentralized, this property is lost in the transformation from task space to joint space $T = J' F$ for implementation, since all joint torques must be applied simultaneously to control each configuration variable.

The centralized and decentralized adaptive control schemes presented in this section are extremely simple since auxiliary signal and controller gains are evaluated from (12)–(18) or (22)–(28) by simple numerical integration using, for instance, the trapezoidal rule. Thus the computational time required to calculated the adaptive control law (11) or (21) is extremely short. As a result, the scheme can be implemented for on-line control of redundant manipulators with high sampling rates; resulting in improved dynamic performance. This is in contrast to most existing approaches which require time-consuming optimization processes unsuitable for fast on-line control implementation. It is important to note that the adaptation laws (12)–(18) or (22)–(28) are based solely on the observed performance of the manipulator rather than on any knowledge of the complex dynamic model or parameter values of the manipulator and the payload. We now discuss briefly the implications of Jacobian singularities on configuration control. Suppose that the transposed augmented Jacobian matrix $J'$ has n distinct eigenvalues $\{\lambda_1, \ldots, \lambda_n\}$, and n right and left eigenvectors $\{u_1, \ldots, u_n\}$ and $\{v_1, \ldots, v_n\}$, respectively, where $J'u_i = \lambda_i u_i$ and $v_i J' = \lambda_i v_i$ for $i = 1, \ldots, n$, and $v_i, u_j = 0$ for all $i \neq j$. Then $J'$ can be expressed by the modal decomposition form $$J' = \sum_{i=1}^{n} \lambda_i u_i v_i.$$

hence, the force-torque transformation becomes $$T = J'F = \sum_{i=1}^{n} (\lambda_i v_i F) u_i. \quad (29)$$

It is seen that along each eigenvector $u_i$, the contribution of the control force F to the joint torque T is equal to $(\lambda_i v_i F) u_i$. Now, suppose that $\lambda_j = 0$ for some j; i.e., the Jacobian matrix J is singular. Then, any control force F in the task-space direction $u_j$ will make no contribution to the joint torque T. Thus the ability to control the manipulator in a certain taskspace direction is impaired. However, the proposed method allows complete control of the manipulator motion in the remaining directions for which $\lambda_i$ is non-zero; since the corresponding control force $F_i$ does not map into zero joint torque T. This is in contrast to pseudoinverse-based methods requiring inversion of the matrix $(J_e J'_e)$ which becomes rank-deficient when the end-effector Jacobian matrix $J_e$ is singular.

The following points are noted about the proposed adaptive configuration control scheme:

(1) By controlling the manipulator directly in task space, the complicated and time-consuming inverse kinematic computations are not required. This makes the scheme computationally efficient as a real-time control algorithm.

(2) Since the control problem is formulated in task space, the method can be extended readily to hybrid force and configuration control, and also to the control of redundant multi-arm robots.

(3) Using this dynamic control scheme, accurate tracking of desired trajectories for the basic and the additional tasks can be achieved simultaneously. Furthermore, in contrast to local methods based on Jacobian pseudoinverse, the proposed scheme provides direct control of the manipulator motion over the entire trajectory.

(4) Redundant manipulators are often composed of many joints to enhance their dexterity and versatility and will therefore have highly complicated dynamic models. When model-based control schemes such as the Computed Torque Technique are used, the on-line computation of the full dynamic model may make it impractical to implement fast control loops. On the other hand, adaptive control schemes provide a practical alternative, since on-line adaptation eliminates the need for the complex dynamic model and thus allows fast control loops to be implemented.

(5) In contrast to pseudoinverse-based methods, the proposed approach does not require the assignment of priorities to the basic and additional task specifications, since the additional task requirements re met independently through the kinematic functions. In other words, the performance of the basic task (end-effector motion) is not sacrificed due to the presence of the additional task (kinematic constraints), provided the task trajectories avoid the augmented Jacobian singularities. In our formulation, the weighting matrices $\{W_p, W_v\}$ are used to assign some degree of relative significance to position and velocity errors of all task variables. These matrices need not be constant throughout the robot motion, and can be varied according to the task requirements.

(6) The proposed formulation provides the capability of satisfying multiple objectives through the definition of basic and additional task requirements. These requirements have simple tangible physical interpretations in terms of the manipulator configuration, rather than abstract mathematical goals. The task requirements are achieved by means of a simple control law which can be implemented as real-time algorithm for on-line control with high sampling rates. Using the proposed formulation, the task to be performed by the redundant manipulator can be decomposed into a number of subtasks with different kinematic constraints. In the execution of each subtask, the appropriate kinematic constraint is satisfied, in addition to the specified end-effector motion.

(7) A distinctive feature of the proposed control scheme is its applicability to the shared operator/autonomous mode of operation for performing a given task. This is due to the fact that the basic task and the additional task appear as two distinct and separate entities in the proposed control scheme, as shown in FIG. 3. The present formulation allows the operator to specify the basic task of desired end-effector motion using an input device such as a hand controller. The autonomous system can then invoke the AI spatial planner to specify the additional task of desired kinematic constraints that will be performed simultaneously through the utilization of redundancy. In this way, the operator and the autonomous system can share the execution of a complex task.

IV. Special Case: Kinematic Optimization

In this section, the configuration control scheme is used to optimize any desired kinematic objective function.

Let $g(\theta)$ denote the scalar kinematic objective function to be optimized by the utilization of redundancy. In order to optimize $g(\theta)$ subject to the end-effector constraint $\dot{Y} = J_e \dot{\theta}$, we apply the standard gradient projection optimization theory to obtain the optimality criterion for the constrained optimization problem as $$(I - J_e^+ J_e) \frac{\partial g}{\partial \theta} = 0 \qquad (30)$$

where $J_e^+ = J'_e (J_e J'_e)$ is the pseudoinverse of $J_e$. The $n \times n$ matrix $(I - J_e J'_e)^{-1}$ is of rank $r$ and therefore (30) reduces to $$N_e \frac{\partial g}{\partial \theta} = 0 \qquad (31)$$

where $N_e$ is an $r \times n$ matrix formed from $r$ linearly independent rows of $(I - J_e^+ J_e)$ is symmetric. The rows of $N_e$ span the r-dimensional null-space of the end-effector Jacobian $J_e$, since $J_e(I - J_e^+ J_e) = 0$ and $(I - J_e^+ J_e)$ is symmetric. Equation (31) implies that the projection of the gradient of the objective function $g(\theta)$ onto the null-space of the end-effector Jacobian matrix $J_e$ must be zero. This is the result used by Baillieul [7]-[11] in the extended Jacobian method. Using the configuration control approach, we define the $r$ kinematic functions as $$\Phi(\theta) = N_e \frac{\partial g}{\partial \theta}$$

and the desired trajectory as $\Phi_d(t) = 0$ to represent (31). Therefore, the configuration vector $X$ and the augmented Jacobian matrix $J$ are now $$X = \begin{pmatrix} Y \\ \cdots \\ N_e \frac{\partial g}{\partial \theta} \end{pmatrix}$$

$$J = \begin{pmatrix} J_e \\ \cdots \\ \frac{\partial}{\partial \theta}\left(N_e \frac{\partial g}{\partial \theta}\right) \end{pmatrix}.$$

The adaptive control scheme of Section III can now be applied directly to ensure that $X(t)$ tracks the desired trajectory $$X_d(t) = \begin{pmatrix} Y_d(t) \\ \Phi_d(t) \end{pmatrix}.$$

Therefore, we have shown that the kinematic optimization problem can be reformulated as a special case of the configuration control problem, and the proposed solution does not require the complicated inverse kinematic transformation.

It must be noted that for a general objective function $g(\theta)$, (30) is only a necessary condition for optimality, and not a sufficient condition. As a result, the satisfaction of the kinematic constraint (31) does not always represent a truly optimal solution.

V. Inequality Constraints

In Section III, the additional task to be performed is formulated as the trajectory tracking problem $\Phi(\theta) = \Phi_d(t)$. In some applications, however, the additional task requirements are expressed naturally as a set of kinematic inequality constraints $\phi(\theta) \geq C$, where $C$ is a constant vector. For instance, when the redundancy is utilized to avoid collision with a workspace object, the distance between the object and the closest robot link should exceed a certain threshold, which leads to an inequality constraint. Similarly, inequality constraints can represent avoidance of joint limits and kinematic singularities.

The formulation of the configuration control scheme allows kinematic inequality constraints to be incorporated directly into the control law. For instance, suppose that the additional task requires the inequality constraint $\phi_i(\theta) \geq c_i$, where $c_i$ is some constant, to be satisfied by the kinematic function $\phi_i$. Then, for $\phi_i(\theta) < c_i$, the tracking errors are defined as $e_i = c_i - \phi_i(\theta)$ and $\dot{e}_i = 0 - \dot{\phi}_i(\theta)$; while for $\phi_i(\theta) \geq c_i$ we have $e_i = \dot{e}_i = 0$. Therefore, we can choose $\phi_{di}(t) = \dot{\phi}_{di}(t) = \ddot{\phi}_{di}(t) = 0$ and use the adaptive feedback control law $F_i = d_i + k_{pi} e_i + k_{vi} \dot{e}_i$ to achieve the additional task requirement.

VI. Joint-Based Configuration Control

The configuration control scheme described in Section III is "task-based," in the sense that the tracking errors are formed and the control actions are generated in the task space. In some applications, it is preferable to use a joint-based control system, for instance, to compensate joint frictions more effectively. In this section, we describe briefly the implementation of the configuration control scheme in a joint-based robot control system.

For joint-based control, we first need to determine the $n \times 1$ desired joint angular position vector $\theta_d(t)$ that corresponds to the $n \times 1$ desired configuration vector $X_d(t)$. This can be done by solving the augmented inverse kinematic equations pertaining to the manipulator. The inverse kinematic solution produces a finite set of joint angles with distinct poses, and often the solution corresponding to the initial pose is selected. Alternatively, the differential kinematic equations can be solved recursively using the augmented Jacobian. The Jacobian approach can be computationally more efficient than the inverse kinematic solution, and can also be used when there is no closed-form analytical solution to the inverse kinematic problem, e.g., for robots with non-spherical wrists.

Once the desired joint trajectory $\theta_d(t)$ is computed, it is used as a setpoint for the joint servo-loops. A joint-based control scheme can be employed to achieve trajectory tracking in joint space. The adaptive joint control law is given by $$T(t) = d(t) + [K_p(t) E(t) + K_v(t) \dot{E}(t)] + [C(t) \theta_d(t) + B(t) \dot{\theta}_d(t) + A(t) \ddot{\theta}_d(t)]$$

For practical implementation of the control schemes discussed so far, we require the capability of sending the control torques computed by the controllers directly to the joint motors. In some applications, the joint servo-loops provided by the robot manufacturer cannot be modified easily to accept torque commands. In such cases, the desired joint trajectories $\theta_d(t)$ computed from the inverse kinematics or Jacobian are simply sent as setpoints to the joint servo-loops, which ensure that trajectory tracking is achieved.

VII. Cyclicity of Motion

Robot manipulators are often employed in repetitive operations. For greater efficiency and reliability, it is highly desirable that at the end of each operation cycle the robot returns to the same configuration. This property is known as "cyclicity" of motion. For a redundant robot, it is possible for the end-effector to return to the same task space position and yet the robot to be in a completely different configuration. In fact, this is generally the result obtained when methods based on Jacobian pseudoinverse are used to control the robot motion.

The configuration control approach has the attractive feature of cyclicity of motion, since through definition of the n configuration variables $\{x_1, \ldots, x_n\}$, the kinematic representation of the manipulator is no longer redundant. Therefore, it can be viewed as a non-redundant manipulator which, in general, possesses the property of cyclicity, provided the singularity boundaries are not crossed. In other words, when the configuration variables traverse a closed path in task space, the joint angles will, in general, traverse a unique closed curve in joint space, and hence the initial and final manipulator configurations will be identical. Therefore, the configuration control scheme meets the essential requirement of cyclicity for repetitive operations.

VIII. Implementation of Configuration Control Scheme

In this section, we discuss the experimental results of three links of an industrial robot using the configuration control scheme.

Figure 5:
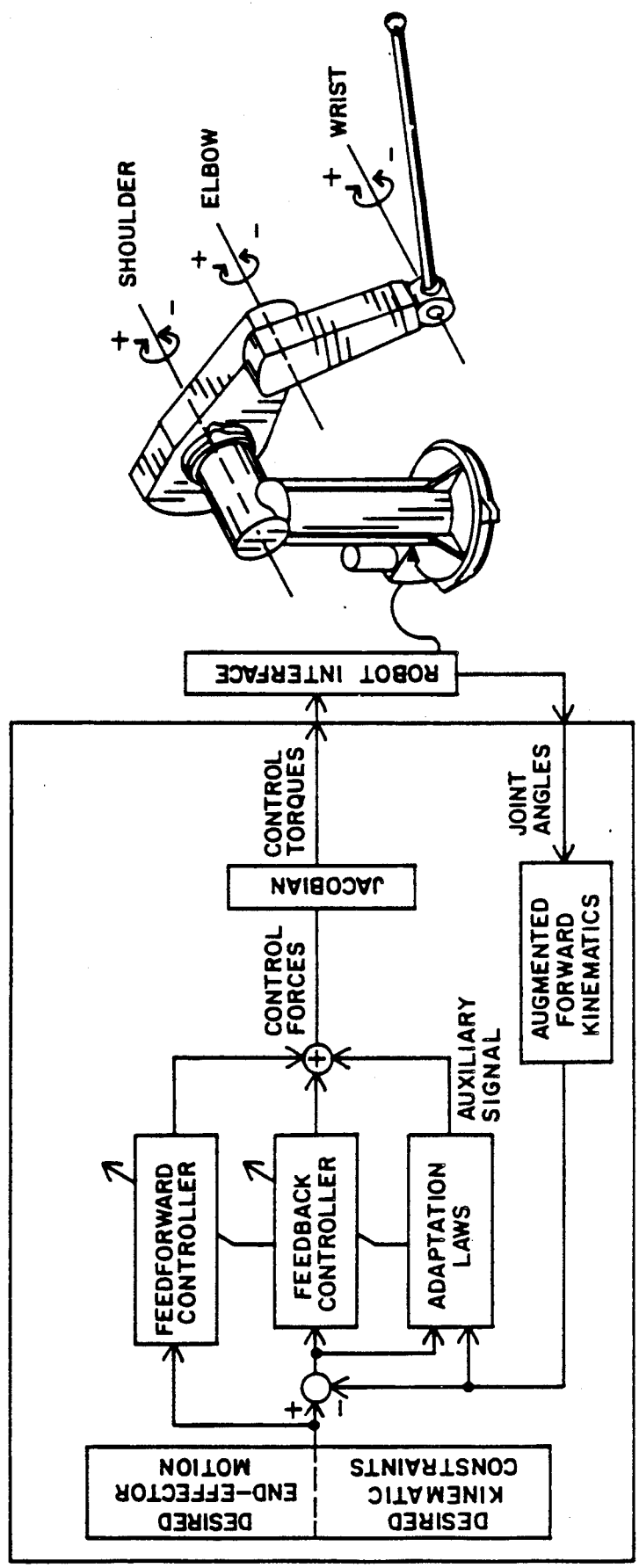
FIG. 5 is a functional block diagram of a testbed facility in which the present invention has been tested.

The testbed facility at the JPL Robotics Research Laboratory consists of a six-jointed Unimation PUMA 560 robot/controller, and a DEC MicroVAX II computer, as shown in the functional diagram of FIG. 5. A cylindrical aluminum "link" has been fabricated and attached to the PUMA wrist as shown in FIG. 5, so that the end-effector can be mounted at the end of the link. The link acts as an extension for the PUMA robot. By activating the shoulder joint $\theta_2$, the elbow joint $\theta_3$, and the wrist joint $\theta_5$, the upper-arm, forearm, and the extra link move in a vertical plane, and hence the pUMA robot can operate as a redundant 3-link planar arm.

The MicroVAX II computer hosts the RCCL (Robot Control "C" Library) software, which was originally developed at Purdue University and subsequently modified and implemented at JPL. The RCCL creates a "C" programming environment in which the user can write his own software for a trajectory generator and a control algorithm to directly control the robot motion. The MicroVAX communicates with the Unimation controller through a high-speed parallel link. During the operation of the robot, a hardware clock constantly interrupts the I/O program resident in the Unimation controller at the preselected sampling period of $T_s = 7$ ms (i.e., $f_s = 143$ Hz), which is the lowest sampling period available in the present experimental setup. At every interrupt, the I/O program gathers information about the state of the robot (such as joint encoder readings), and transmits these data to the control program in the MicroVAX. The I/O program then waits for the control program to issue a new set of control signals, which are then dispatched to the appropriate joint motors. Therefore, the MicroVAX acts as a digital controller for the PUMA robot and the Unimation controller is effectively by-passed and is utilized merely as an I/O device to interface the MicroVAX to the PUMA joint motors.

To test and evaluate the configuration control scheme of the present invention, the proposed controller is implemented on the three joints $[\theta_2, \theta_3, \theta_5]$ of the PUMA 560 robot; while the remaining three joints $[\theta_1, \theta_4, \theta_6]$ are held at their zero positions. For clarity of presentation, the three coplanar links of PUMA, namely, upper-arm ($l_1 = 432$ mm), forearm ($l_2 = 433$ mm), and the extra link ($l_3 = 577$ mm) are redrawn in FIG. 6 to form a 3-link planar arm, and the offset between upper-arm and forearm is ignored. The base coordinate frame (x, y) is then assigned to the planar arm as shown in FIG. 7, with the origin coinciding with the shoulder joint. The joint angles $[\psi_1, \psi_2, \psi_3]$ are defined as "absolute" angles between the links and the positive x direction; hence in terms of the PUMA relative angles ($\theta_2, \theta_3, \theta_5$) measured from the PUMA zero position we have $\psi_1 = -\theta_2$, $\psi_2 = -\theta_2 - \theta_3 + 90°$, and $\psi_3 = -\theta_2 - \theta_5 + 90°$. The problem is to control the Cartesian coordinates [x, y] of the endpoint (tip of the extra link) in the base frame as the basic task, together with controlling a user-specified kinematic function $\phi$ which defines and appropriate additional task. The set $[x, y, \phi]$ then defines the configuration vector of the 3-link planar arm. The control scheme is implemented in a decentralized structure in task space, where each configuration variable is controlled independently by a simple feedback controller with adaptive gains.

Two different choices for the additional task variable $\phi$ will be considered. In the first case, $\phi$ is chosen in joint space as the shoulder angle; while, in the second case, $\phi$ is defined in Cartesian space as the wrist height.

Case (i)-Control of Shoulder Angle: In this case, we wish to use the redundancy to control the shoulder angle $\psi_1$. The shoulder joint requires the highest torque to cause motion, since the inertia of the whole arm is reflected back to the shoulder. Therefore, by controlling $\psi_1$ directly, we attempt to keep the largest joint torque under control. It is noted that in this case, the 3-link manipulator can be viewed as a 2-link arm ($l_2, l_3$) mounted on a moveable base. Therefore, by slow base motion and fast endpoint movement, we can achieve fast manipulation with low torques.

Figure 6:
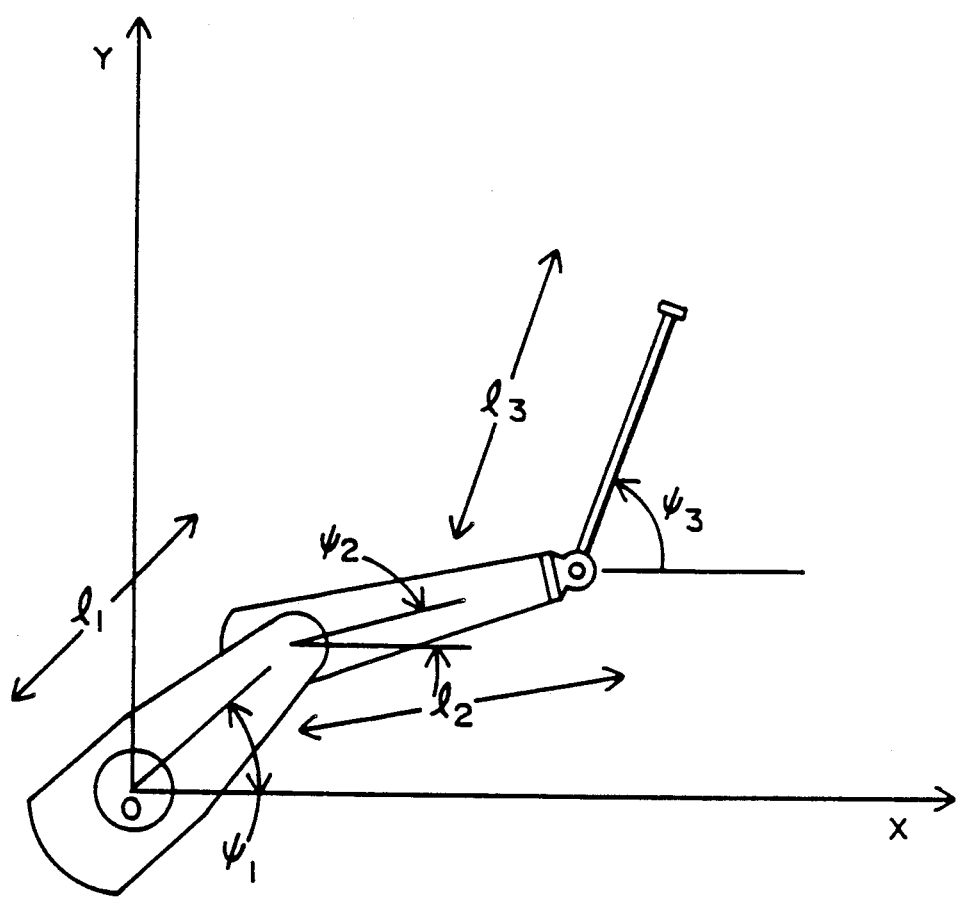
FIG. 6 is a graphical two-dimensional illustration of a robot's 3-link arm employed in the testbed facility of FIG. 5.
Figure 7:
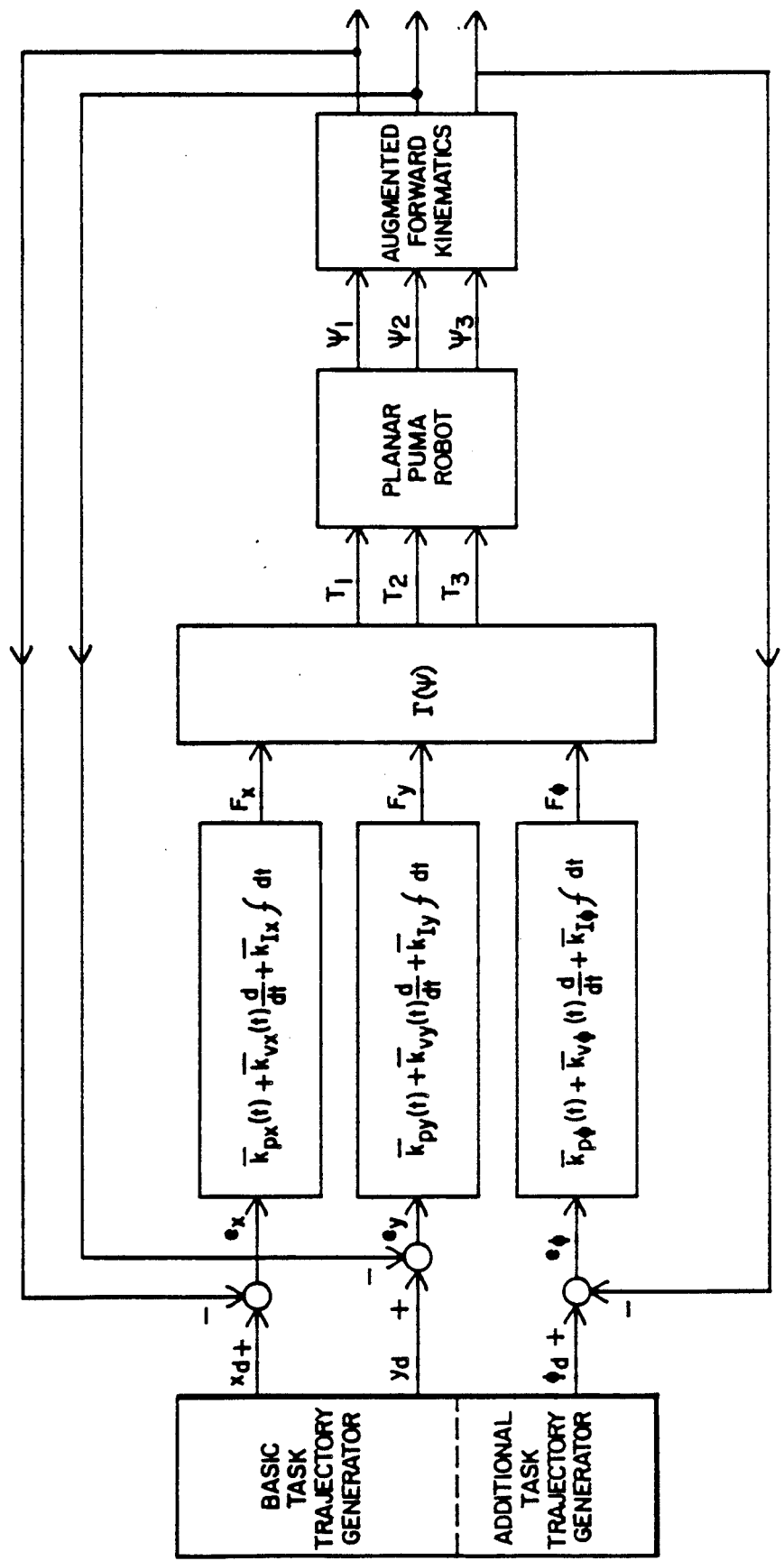
FIG. 7 is a block diagram of the inventive configuration control scheme employed in the robot arm of FIG. 6.

Referring to FIG. 6, the configuration variables and the augmented Jacobian matrix are given by $$
\begin{aligned}
x(t) &= l_1 \cos \psi_1(t) + l_2 \cos \psi_2(t) + l_3 \cos \psi_3(t) \\
y(t) &= l_1 \sin \psi_1(t) + l_2 \sin \psi_2(t) + l_3 \sin \psi_3(t) \\
\phi(t) &= \psi_1(t)
\end{aligned}
\quad (53)
$$

$$
J = \begin{bmatrix} -l_1 \sin \psi_1 & -l_2 \sin \psi_2 & -l_3 \sin \psi_3 \\ l_1 \cos \psi_1 & l_2 \cos \psi_2 & l_3 \cos \psi_3 \\ 1 & 0 & 0 \end{bmatrix}. \quad (54)
$$

The singular configurations of the arm are obtained from $$det[J] = -l_2 l_3 \sin(\psi_2 - \psi_3).$$

Hence, the arm is at a singularity when $\psi_2 = \psi_3$ or $\psi_2 = \psi_3 + 180°$, i.e., links 2 and 3 are aligned. These can be recognized as the classic singularities of the two-link arm ($l_2, l_3$).

In the experiment, the initial configuration of the three-link, arm is chosen as $\psi_{i1} = 0°$, $\psi_{i2} = 90°$, and $\psi_{i3} = 45°$. This results in the initial values of the configuration variables obtained from (53) as $(x_i, y_i, \phi_i) = (839$ mm, 842 mm, 0°). The desired final values of the configuration variables are specified as $(x_f, y_f, \psi_f) = (1100$ mm, 600mm, 60°). The desired transition from the initial to the final values is described by the smooth cycloidal trajectories (55)

-continued $$x_d(t) = 839 + \frac{1100 - 839}{2\pi}\left[\frac{2\pi t}{3} - \sin\frac{2\pi t}{3}\right] \text{mm}, \quad 0 \leq t \leq 3$$
$$= 1100 \text{ mm}, \quad 3 < t$$

$$y_d(t) = 842 + \frac{600 - 842}{2\pi}\left[\frac{2\pi t}{3} - \sin\frac{2\pi t}{3}\right] \text{mm}, \quad 0 \leq t \leq 3$$
$$= 600 \text{ mm}, \quad 3 < t$$

$$\phi_d(t) = 0 + \frac{60 - 0}{2\pi}\left[\frac{2\pi t}{3} - \sin\frac{2\pi t}{3}\right] \text{deg}, \quad 0 \leq t \leq 3$$
$$= 60°, \quad 3 < t$$

and the transition time is 3 s. Note that the desired path for the endpoint is a straight line, since from the above equations we have $$\frac{x_d - 839}{1100 - 839} = \frac{y_d - 842}{600 - 842}.$$

The configuration variables $[x, y, \phi]$ are controlled by three independent adaptive feedback control laws of the general form $$F_i(t) = d_i(t) + K_{pi}(t)e_i(t) + K_{vi}(t)\dot{e}_i(t), i = x, y, \phi \quad (56)$$

as shown in the block diagram of FIG. 7, where the feedforward terms are omitted to reduce the on-line computation time. In (56), F is the task-space control force, d is the auxiliary signal, $(k_d, k_v)$ are the position and velocity feedback gains, and $(e, \dot{e})$ are the position and velocity errors; e.g., $e_x = x_d - x$ and $\dot{e}_x = \dot{x}_d - \dot{x}$. The current values of the configuration variables are computed from the joint angles using the augmented forward kinematic model (53). The terms in the control law (56) are updated on the basis of the weighted error $q_i(t)$ as $$q_i(t) = w_{pi}e_i(t) + w_{vi}\dot{e}_i(t) \quad (57)$$

$$d_i(t) = d_i(0) + \delta_{1i}\int_0^t q_i(t)dt + \delta_{2i}q_i(t) \quad (58)$$

$$k_{pi}(t) = k_{pi}(0) + \alpha_{1i}\int_0^t q_i(t)e_i(t)dt + \alpha_{2i}q_i(t)e_i(t) \quad (59)$$

$$k_{vi}(t) = k_{vi}(0) + \beta_{1i}\int_0^t q_i(t)\dot{e}_i(t)dt + \beta_{2i}q_i(t)\dot{e}_i(t). \quad (60)$$

It is noted that, from (57), (58), the control law (56) can alternatively be rewritten in the PID form $$F_i(t) = F_i(0) + k_{pi}(t)e_i(t) + k_{vi}(t)\dot{e}_i(t) + k_{Ii}\int_0^t e_i(t)dt. \quad (61)$$

Once the task-space control forces $[F_x, F_y, F_\phi]$ are generated by the controllers in (56) or (61), the required joint control torques $[T_1, T_2, T_3]$ are obtained from $$T(t) = J^T(\psi)F(t) \quad (62)$$

where J is the 3×3 augmented Jacobian matrix given in (54). It must be noted that the controller equations (56)-(60) are implemented in RCCL in discrete form, with the integrals computed by the trapezoidal rule.

Furthermore, we ignore the dynamics of the joint motors by assuming that the demanded and the generated joint torques are always equal.

In the experiment, the adaptation gains in (57)-(60) are chosen after a few trial and errors as $$w_{px} = 50 \quad w_{vx} = 30 \quad w_{py} = 10 \quad w_{vy} = 10$$
$$w_{p\phi} = 40 \quad w_{v\phi} = 20$$

$$\delta_{1x} = 50, \quad \delta_{1y} = 40, \quad \delta_{1\phi} = 50, \quad \delta_{2i} = 0, \text{ for } i = x, y, \phi$$
$$\alpha_{1x} = 100, \quad \alpha_{1y} = 100, \quad \alpha_{1\phi} = 100, \quad \alpha_{2i} = 0, \text{ for } i = x, y, \phi$$
$$\beta_{1x} = 200, \quad \beta_{1y} = 200, \quad \beta_{1\phi} = 800, \quad \beta_{2i} = 0, \text{ for } i = x, y, \phi.$$

These values do not represent the "optimum" settings of the adaptation gains that can be chosen for the experiment. The initial values of the controller terms are chosen as follows:

$$k_{pi}(0) = 0, i = x, y, \phi$$
$$k_{vx}(0) = 80 \quad k_{vy}(0) = 20 \quad k_{v\phi}(0) = 0$$

$$\begin{pmatrix} d_x(0) \\ d_y(0) \\ d_\phi(0) \end{pmatrix} = [J^T(\psi_i)]^{-1}\begin{pmatrix} T_1(0) \\ T_2(0) \\ T_3(0) \end{pmatrix} + \begin{pmatrix} 3 \text{ sgn }[x_d(3) - x(0)] \\ 0 \\ 10 \text{ sgn }[\phi_d(3) - \phi(0)] \end{pmatrix}$$

where $(T_1(0), T_2(0), T_3(0))$ are the initial joint torques used to approximately compensate for the initial gravity loading, and the sign terms are chosen empirically to overcome the large stiction (static friction) present in the joints. The initial gravity torque for the third link is given by $$T_3(0) = \frac{l_3}{2}m_3g \cos\psi_3(0) = 0.8844 \cos\psi_3(0)$$

where $m_3 = 0.3125$ kg; and the initial gravity torques for the first and second links are $$T_1(0) = 8.4\cos\psi_2(0) + 37.2\cos\psi_1(0) + 1.02\sin\psi_1(0)$$

$$T_2(0) = 8.4\cos\psi_2(0) - 0.25\sin\psi_2(0).$$

It is important to note that although the arm is moving in the vertical plane with large joint frictions, gravity and friction compensations are not used separately in addition to the control law (56), and are used merely as the initial auxiliary signal in order to improve the initial response of the arm.

Figure 8:
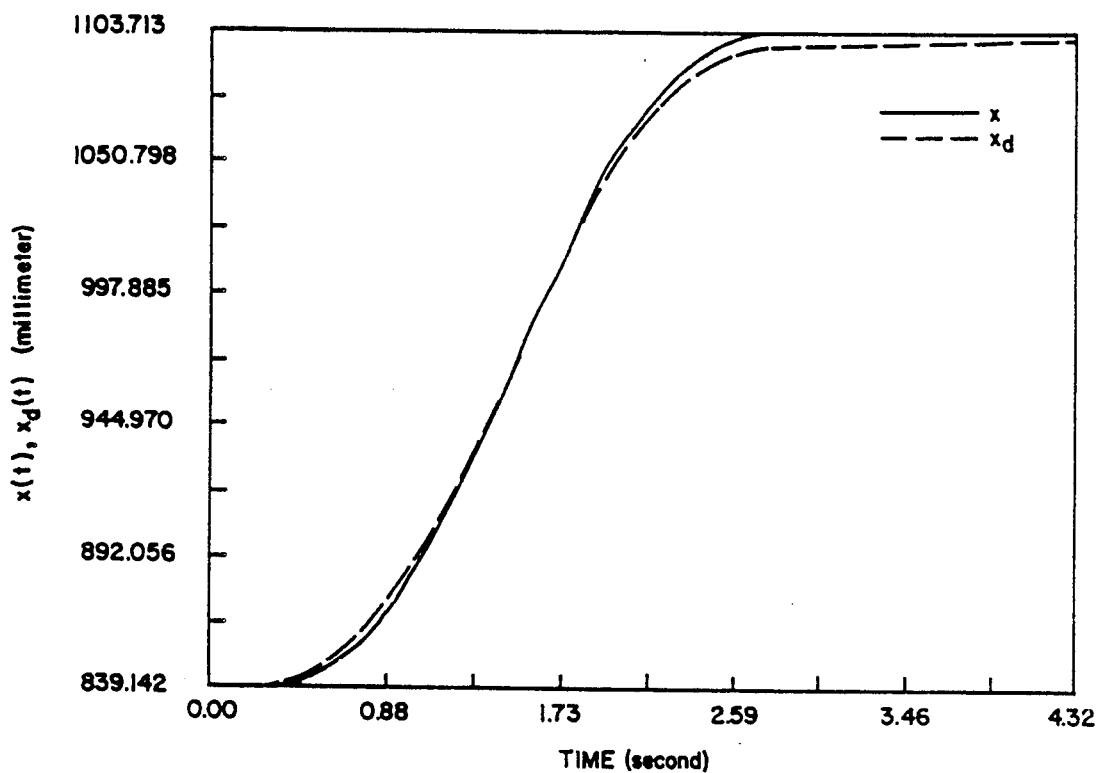
FIGS. 8-10 are respective graphical representations of time response characteristics of the robot arm of FIG. 6 when the shoulder angle thereof is controlled using the control technique of the invention.
Figure 9:
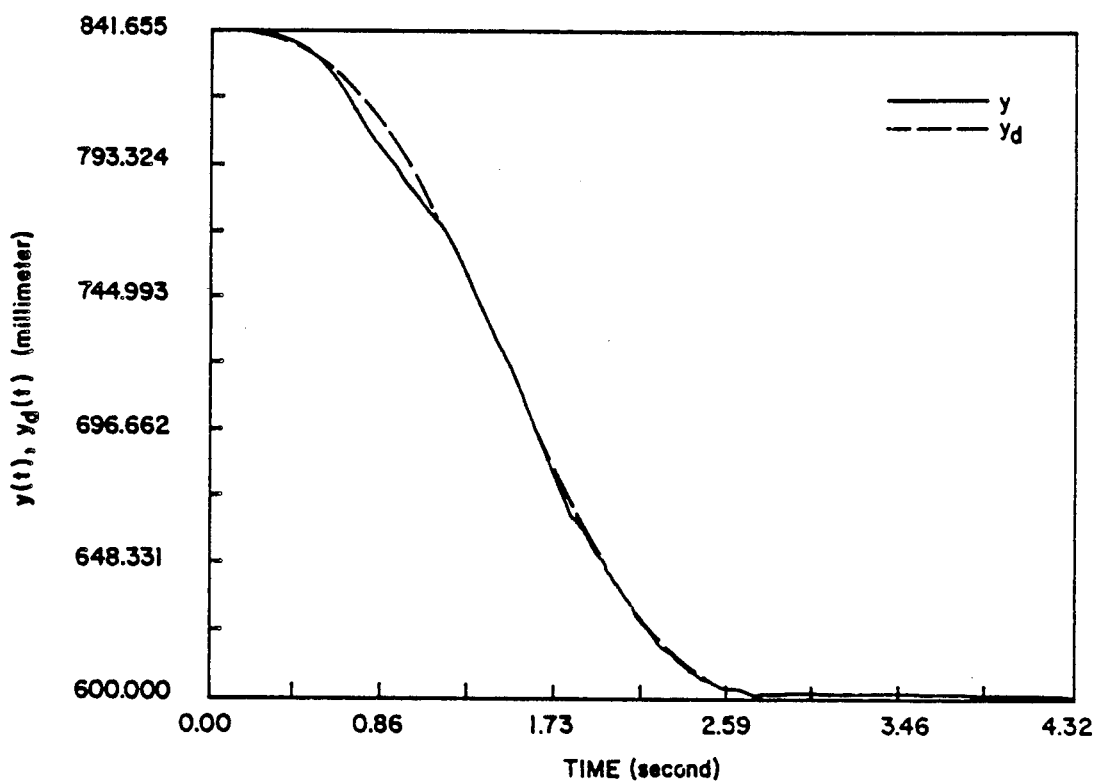
Figure 10:
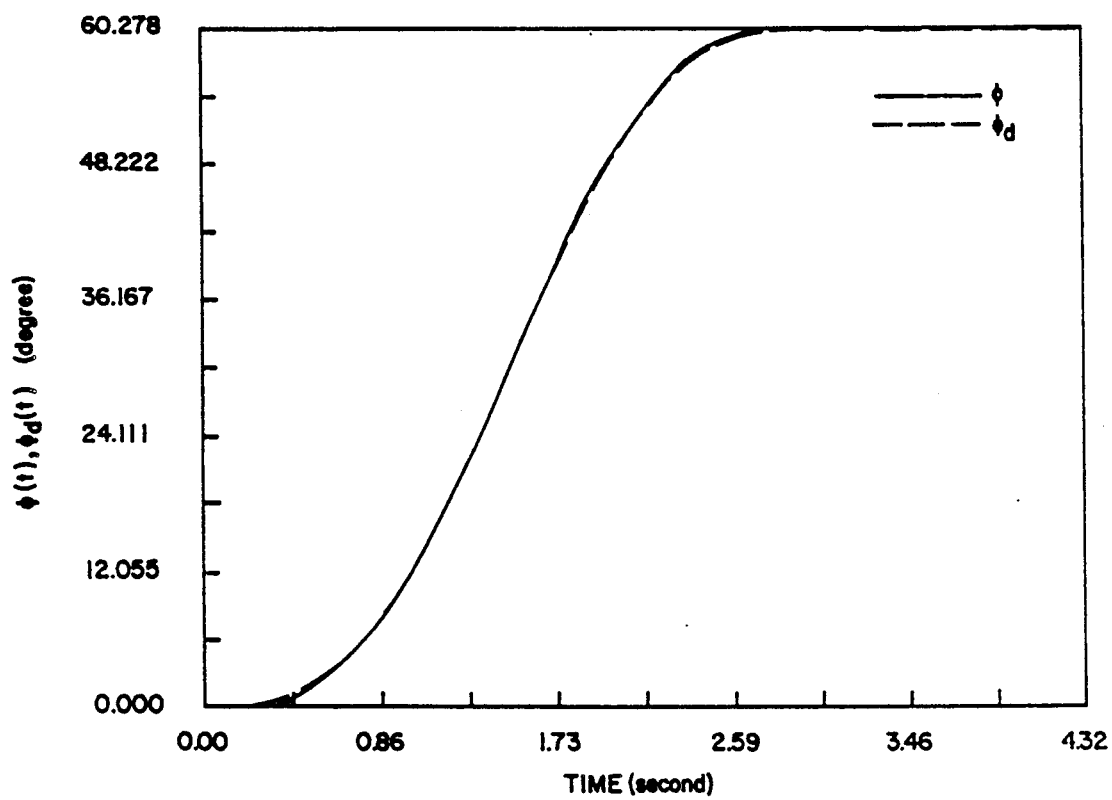

In the experiment, the configuration variables $[x(t), y(t), \phi(t)]$, representing the endpoint coordinates and the shoulder angle, are commanded to change simultaneously from the initial to the final values in 3 s by tracking the desired cycloidal trajectories of (55). During the arm motion, the joint encoder counts are recorded and transformed using (53) to obtain the values of the configuration variables. FIGS. 8, 9, and 10 show the desired and actual trajectories of the configuration variables. It is seen that each variable $[x(t), y(t), \phi(t)]$ tracks the corresponding reference trajectory closely using the simple decentralized control scheme of (56), despite the coupled non-linear robot dynamics. Some discrepancy is observed between $[x(t), y(t)]$ and $[x_d(t), y_d(t)]$ at low speed of endpoint motion which can be interpreted physically as follows. When the endpoint is moving at low speed, the joint angles are changing very slowly, and hence the stiction and Columb friction present in the joints become more dominant and oppose the motion, causing a slight tracking error. Since the position and velocity tracking error e(t) and e(t) are very small, the rate of adaptation of the controller terms [d(t), $k_p$(t), $k_v$(t)] are also small. In this situation, it is primarily the output of the integral term $$K_1 \int e \, dt$$

that needs to build up sufficiently so as to overcome the large friction and cause proper joint motion to correct the error.

Case (ii)——Control of Wrist Height: In this case, the redundancy is used to control the vertical coordinate of the wrist. This is a suitable additional task in situations where we wish to avoid collision with a vertical obstacle, such as a wall, in the workspace. By controlling the wrist height, we ensure that the arm can go over the wall and the endpoint can reach a point behind the wall. This can provide a simple alternative approach to the more complicated obstacle avoidance schemes.

As in Case (i), the initial joint angles are $\psi_{i1}=0°$, $\psi_{i2}=90°$, $\psi_{i3}=45°$; yielding the initial arm configuration variables as $(x_i, y_i, \phi_i) = (839\text{mm}, 842\text{mm}, 433\text{mm})$. It is desired to change the arm configuration variables in 3 s to the final values $(x_f, y_f, \phi_f) = (1000 \text{ mm}, 500 \text{ mm}, 700 \text{ mm})$ by tracking the following cycloidal reference trajectories:

$$\begin{aligned} x_d(t) &= 839 + \frac{1000 - 839}{2\pi}\left[\frac{2\pi t}{3} - \sin\frac{2\pi t}{3}\right] \text{mm}, \quad 0 \leq t \leq 3 \\ &= 1000 \text{ mm}, \quad 3 < t \\ y_d(t) &= 842 + \frac{500 - 842}{2\pi}\left[\frac{2\pi t}{3} - \sin\frac{2\pi t}{3}\right] \text{mm}, \quad 0 \leq t \leq 3 \\ &= 500 \text{ mm}, \quad 3 < t \\ \phi_d(t) &= 433 + \frac{700 - 433}{2\pi}\left[\frac{2\pi t}{3} - \sin\frac{2\pi t}{3}\right] \text{mm}, \quad 0 \leq t \leq 3 \\ &= 700 \text{ mm}, \quad 3 < t. \end{aligned} \quad (65)$$

Note that this yields a straight-line path for the endpoint, since we have $$\frac{x_d - 839}{1000 - 839} = \frac{y_d - 842}{500 - 842}.$$

The three configuration variables $[x, y, \phi]$ are controlled using three independent adaptive feedback controllers as described in Case (i) and shown in FIG. 7. After a few trial and errors, the adaptation gains are chosen as $w_{px} = 90$  $w_{vx} = 25$  $w_{py} = 15$
$w_{vy} = 20$  $w_{p\phi} = 30$  $w_{v\phi} = 60$ $\delta_{1x} = 120, \delta_{1y} = 60, \delta_{1\phi} = 200, \delta_{2i} = 0$, for $i = x,y,\phi$
$\alpha_{1x} = 200, \alpha_{1y} = 100, \alpha_{1\phi} = 100, \alpha_{2i} = 0$, for $i = x,y,\phi$
$\beta_{1x} = 200, \beta_{1y} = 200, \beta_{1\phi} = 200, \beta_{2i} = 0$, for $i = x,y,\phi$.

The initial values of the controller gains are selected as $k_{pi}(0) = 0, i = x,y,\phi$ -continued
$k_{vx} = 130$  $k_{vy} = 30$  $k_{v\phi} = 400$ and the initial auxiliary signals are chosen as in Case (i) with the friction coefficients [3, 0, 40].

Figure 11:
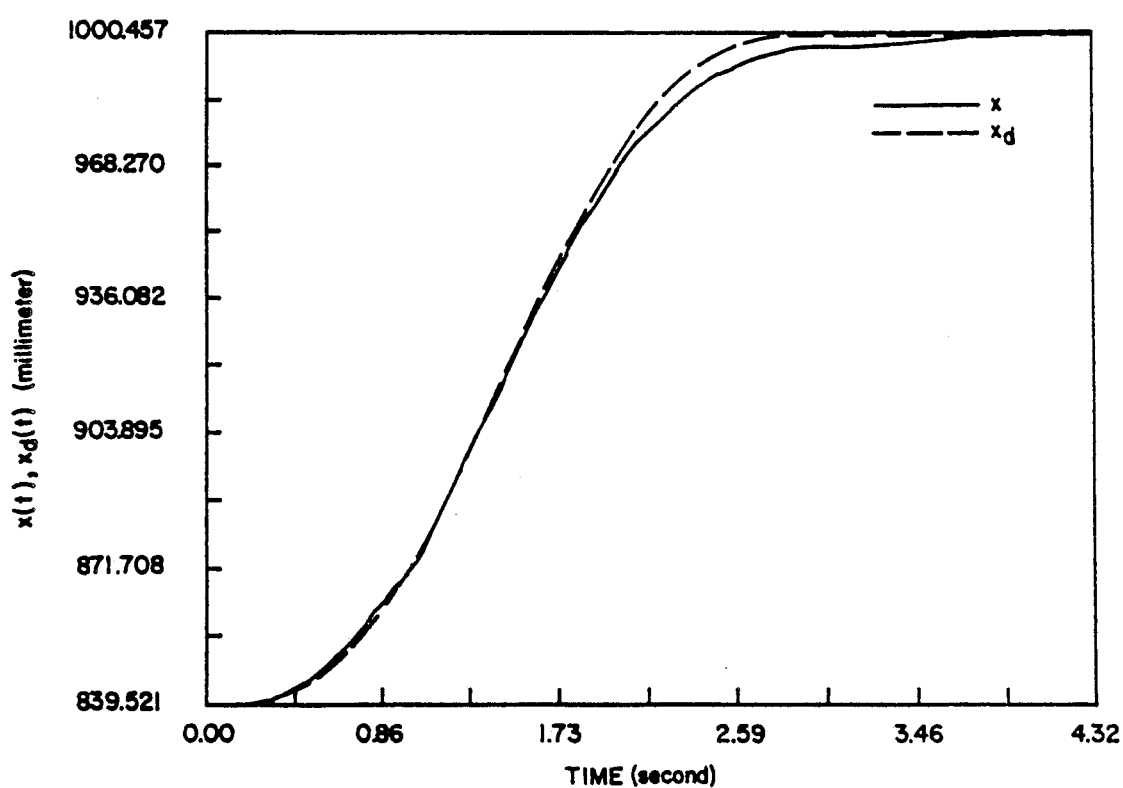
FIGS. 11-13 are respective graphical representations of time response characteristics of the robot arm of FIG. 6 when the wrist height thereof is controlled using the control technique of the present invention.
Figure 12:
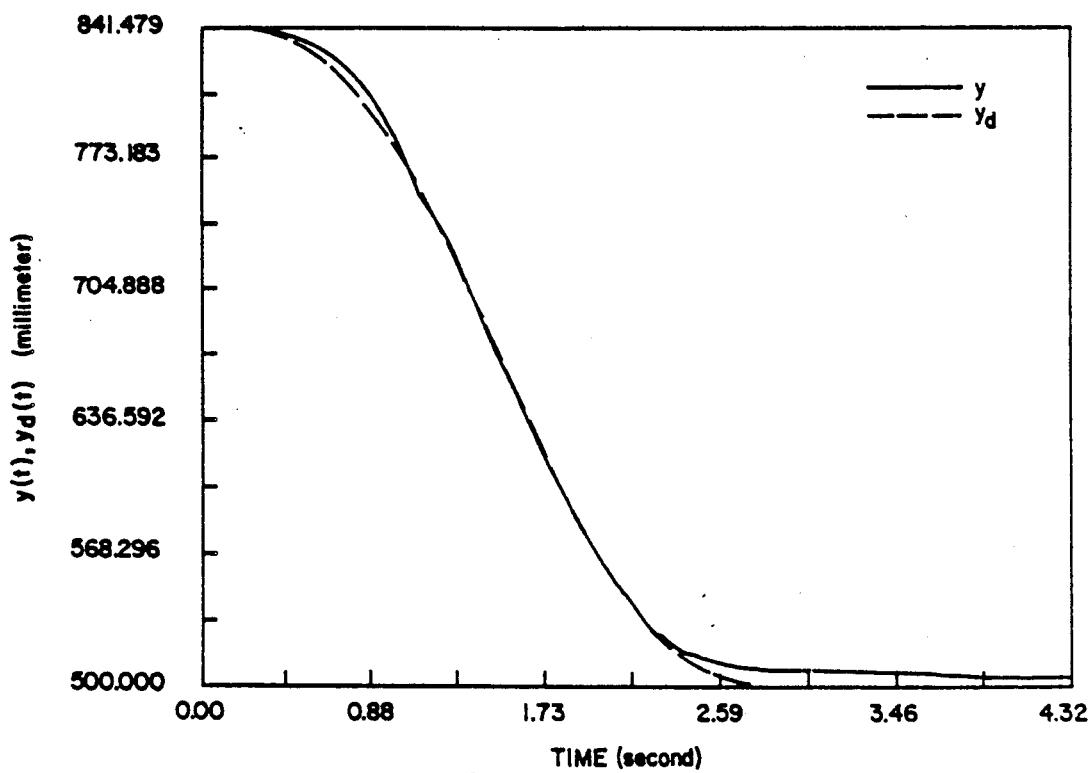
Figure 13:
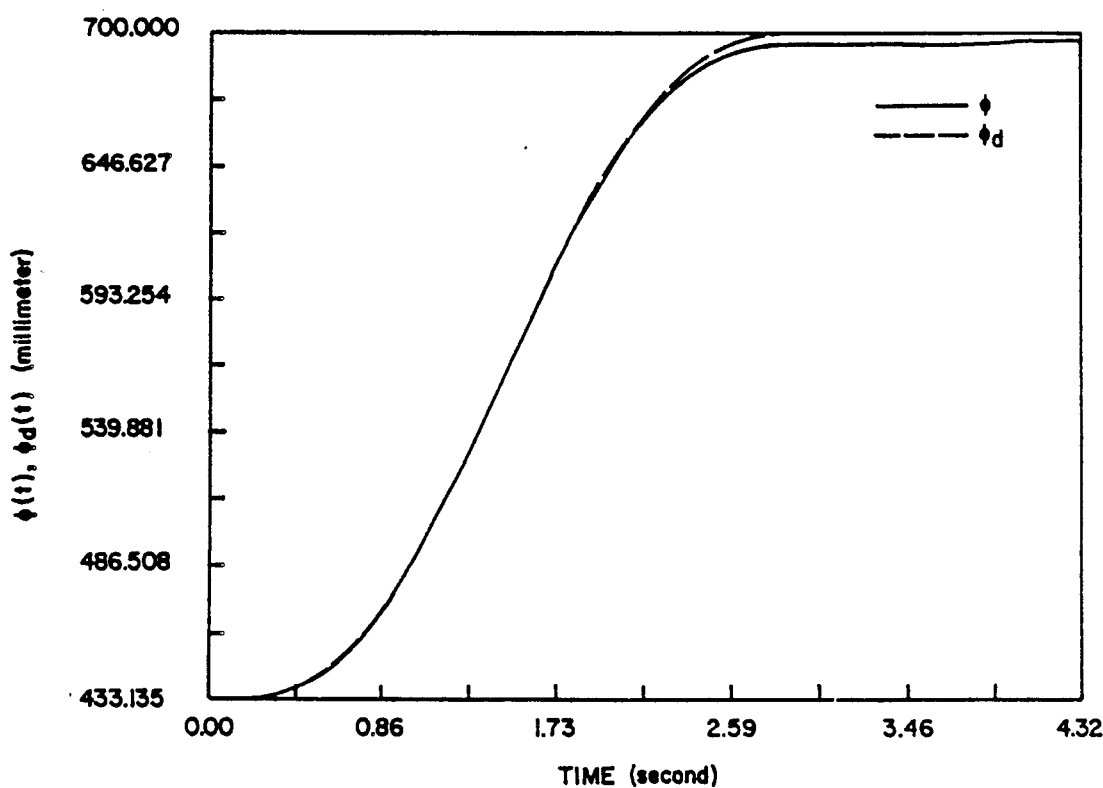

In the experiment, we command the configuration variables [x(t), y(t), $\phi$ (t)], representing the endpoint coordinates and the wrist height, to change from the initial to the final values in 3 s by tracking the desired cycloidal trajectories (65). FIGS. 11, 12 and 13 show the desired and actual trajectories of the configuration variables, and illustrates that each variable tracks the corresponding reference trajectory closely using a simple decentralized control scheme. There is a slight tracking error of joint friction at low speed of motion. In other words, when the endpoint and wrist are moving slowly, the velocities of joint angles are so low that the friction effects dominate until the controller torques overcome the frictions and corrective actions are taken.

Finally, it is important to note that in both Cases (i) and (ii), by increasing the rate of sampling from $f_s=143$ Hz to say $f_s=1000$ Hz, considerable improvement is expected in the tracking performance of the controllers. However, the present experimental setup cannot operate faster than $f_s=143$ Hz. Furthermore, the PUMA robot has very large static and Columb frictions, and better results are expected with an inner-loop friction compensation. Nonetheless, given the limitations of the present experimental setup, it is believed that the experimental results demonstrate the capabilities of the configuration control scheme of the present invention and validate the scheme in a realistic environment.

CONCLUSIONS

It will now be understood that a simple formulation for configuration control of redundant manipulators has been developed. The controller achieves trajectory tracking for the end-effector directly in the Cartesian space to perform some desired basic task. In addition, the redundancy is utilized by imposing a set of kinematic constraints on the manipulator to accomplish an appropriate additional task. The proposed formulation incorporates the kinematic constraints (additional task) and the end-effector motion (basic task) in a conceptually simple and computationally efficient manner to resolve the redundancy. Furthermore, the adaptive controller has a very simple structure and the controller gains are updated in a simple manner to compensate for changing dynamic characteristics of the manipulator. The adaptation laws are based on the observed performance of the manipulator rather than on any knowledge of the manipulator dynamic model. Thus the adaptive controller is capable of ensuring a satisfactory performance when the payload mass is unknown and time-varying. Any approach used to resolve redundancy should be implementable as a real-time algorithm, and therefore the speed of computation is a critical factor. The small amount of computations required by the proposed method offers the possibility of efficient real-time control of redundant manipulators.

It is important to appreciate the difference between the conventional pseudoinverse-based methods and the configuration control scheme. Pseudoinverse-based methods resolve the redundancy at the velocity level and yield local optimization results. In the configuration control scheme, the redundancy is resolved at the position (i.e., task) level to provide direct control over the entire motion. Furthermore, pseudoinverse-based methods do not generally produce cyclic motion of the manipulator, which is an essential requirement for repetitive operations; whereas the proposed scheme ensures cyclicity. It is also important to distinguish between the extended Jacobian method and the method of the present invention. The extended Jacobian method is concerned with solving the inverse kinematic problem for redundant robots by extending the end-effector Jacobian to include an optimization subtask, assuming the initial robot configuration is optimal. The present invention, however, provides a dynamic control scheme for redundant manipulators based on any desired task augmentation, without requiring the inverse kinematic solution. It is also shown that the extended Jacobian method can be treated as a special case of the configuration control scheme. It is observed that when optimizing an objective function in joint space, the variation of the manipulator configuration in task space is not controlled directly, and this may lead to undesirable motions of the manipulator.

Those having skill in the arts relevant to the present invention, will now perceive variations and additions to the invention based upon the preferred embodiment disclosed herein. Thus, it will be understood that the invention is not to be limited to the disclosed embodiment, but is to be deemed to be limited only by the scope of the claims appended hereto.

I claim:

1. An apparatus for controlling a redundant robot; the apparatus comprising:
   means for defining a set of end-effector coordinates corresponding to a basic task motion of said robot;
   means for defining a set of kinematic functions corresponding to an additional task motion capability available as a result of the redundancy of said robot;
   means for combining said set of coordinates and said set of functions to form a set of task-related configuration variables as generalized coordinates for control of said robot; and
   means for dynamically modifying said configuration variables in accordance with a task-based adaptive scheme for tracking at least one reference trajectory during robot motion.

2. The apparatus recited in claim 1 wherein said means for defining said set of kinematic functions comprises means for defining said set of functions in Cartesian space.

3. The apparatus recited in claim 1 wherein said means for defining said kinematic functions comprises means for defining said set of functions in joint space.

4. The apparatus recited in claim 1 wherein said additional task motion is based on kinematic equality constraints.

5. The apparatus recited in claim 1 wherein said additional task motion is based on kinematic inequality constraints.

6. The apparatus recited in claim 1 wherein said adaptive scheme is centralized.

7. The apparatus recited in claim 1 wherein said adaptive scheme is decentralized.

8. The apparatus recited in claim 1 wherein said means for dynamically modifying operates in essentially real time.

9. The apparatus recited in claim 1 wherein said end-effector coordinated-defining means is operator controlled.

10. The apparatus recited in claim 9 wherein said kinematic-function-defining means is autonomously controlled during said operator control of said end-effector coordinate-defining means.

11. A method for controlling a redundant robot; the method comprising the steps of:
    (a) defining a set of end-effector coordinates corresponding to a basic task motion of said robot;
    (b) defining a set of kinematic functions corresponding to an additional task motion capability available as a result of the redundancy of said robot;
    (c) combining said set of coordinates and said set of functions to form a set of task-related configuration variables as generalized coordinates for control of said robot; and
    (d) dynamically modifying said configuration variables in accordance with a task-based adaptive scheme for tracking at least one reference trajectory during robot motion.

12. The method recited in claim 11 wherein step (b) further comprises the step of defining said set of functions in Cartesian space.

13. The method recited in claim 11 wherein step (b) further comprises the step of defining said set of functions in joint space.

14. The method recited in claim 11 wherein step (b) further comprises the step of basing said additional task motion on kinematic equality constraints.

15. The method recited in claim 11 wherein step (b) further comprises the step of basing said additional task motion on kinematic inequality constraints.

16. The method recited in claim 11 wherein in step (d) said adaptive scheme is centralized.

17. The method recited in claim 11 wherein in step (d) said adaptive scheme is decentralized.

18. The method recited in claim 11 wherein step (d) is carried out in essentially real time.

19. The method recited in claim 11 wherein step (a) is performed under the control of an operator.

20. The method recited in claim 19 wherein step (b) is performed autonomously while step (a) is performed under said operator control.

* * * * *